United States Patent
Jain et al.

(10) Patent No.: US 12,430,333 B2
(45) Date of Patent: Sep. 30, 2025

(54) EFFICIENTLY PROCESSING QUERY WORKLOADS WITH NATURAL LANGUAGE STATEMENTS AND NATIVE DATABASE COMMANDS

(71) Applicant: Oracle International Corporation, Redwood Shores, CA (US)

(72) Inventors: Sanket Jain, Redwood City, CA (US); Kumar Rajamani, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 58 days.

(21) Appl. No.: 18/438,224

(22) Filed: Feb. 9, 2024

(65) Prior Publication Data

US 2025/0258819 A1 Aug. 14, 2025

(51) Int. Cl.
| | |
|---|---|
| G06F 16/24 | (2019.01) |
| G06F 16/2453 | (2019.01) |
| G06F 40/186 | (2020.01) |
| G06F 40/279 | (2020.01) |
| G06F 40/30 | (2020.01) |

(52) U.S. Cl.
CPC ...... *G06F 16/24542* (2019.01); *G06F 40/186* (2020.01); *G06F 40/279* (2020.01); *G06F 40/30* (2020.01)

(58) Field of Classification Search
CPC ............ G06F 16/24542; G06F 40/279; G06F 40/186; G06F 40/30

USPC ......................................................... 707/718
See application file for complete search history.

(56) References Cited

U.S. PATENT DOCUMENTS

| | | | |
|---|---|---|---|
| 12,038,958 B1* | 7/2024 | Soubbotin | G06F 16/335 |
| 12,265,570 B2* | 4/2025 | Siebel | G06F 16/334 |
| 2004/0103100 A1* | 5/2004 | Levine | G06F 16/20 |
| 2007/0112714 A1* | 5/2007 | Fairweather | G06F 8/427 |
| | | | 706/46 |
| 2014/0079297 A1* | 3/2014 | Tadayon | G06V 40/172 |
| | | | 382/118 |
| 2016/0232160 A1* | 8/2016 | Buhrmann | G06F 40/14 |
| 2019/0384762 A1* | 12/2019 | Hill | G06F 16/2272 |

(Continued)

*Primary Examiner* — Hanh B Thai
(74) *Attorney, Agent, or Firm* — Mughal Gaudry & Franklin PC

(57) ABSTRACT

A database query processing service is provided for efficiently processing query workloads with natural language statements and native database commands. The database query processing service may receive some database queries that do not contain a natural language marker and process these database queries without using large language models to generate replacement query content. The database query processing service may also receive other database queries that do contain the natural language marker and process the other database queries using large language model(s) to generate replacement query content or leverage replacement query content already generated by the large language model(s). The replacement query content is checked to ensure the content is natively valid for the content to retrieve data from database structures referenced in the content. The database query processing service may use the natively valid replacement query content to cause execution of operations responsive to the other database queries.

20 Claims, 7 Drawing Sheets

(56) References Cited

U.S. PATENT DOCUMENTS

| | | | |
|---|---|---|---|
| 2023/0109681 A1* | 4/2023 | Gotmare | G06N 3/0475 704/9 |
| 2023/0410801 A1* | 12/2023 | Mishra | H04L 51/02 |
| 2024/0037327 A1* | 2/2024 | Kallepalli | G06F 40/211 |
| 2024/0062571 A1* | 2/2024 | Anzenberg | G06V 30/413 |
| 2024/0121125 A1* | 4/2024 | Blair | G06F 40/263 |
| 2024/0202221 A1* | 6/2024 | Siebel | G06F 16/3347 |
| 2024/0249318 A1* | 7/2024 | Spiegel | H04L 51/02 |
| 2024/0281410 A1* | 8/2024 | Williams | G06F 16/122 |
| 2024/0281600 A1* | 8/2024 | Brown | G06F 40/20 |
| 2024/0281621 A1* | 8/2024 | Janakiraman | G06F 40/47 |
| 2024/0289395 A1* | 8/2024 | Zhou | G06F 16/9532 |
| 2024/0303247 A1* | 9/2024 | Sokolov | G06F 16/245 |
| 2024/0311619 A1* | 9/2024 | Licato | G06N 20/00 |
| 2024/0319970 A1* | 9/2024 | Watson | G06F 8/35 |
| 2024/0346255 A1* | 10/2024 | Blohm | G06F 40/30 |
| 2024/0354321 A1* | 10/2024 | Kundel | G06F 16/3344 |
| 2024/0362209 A1* | 10/2024 | Almaer | G06F 16/2433 |
| 2024/0362421 A1* | 10/2024 | Markov | G06F 40/216 |
| 2024/0378206 A1* | 11/2024 | Po | G06F 16/24566 |
| 2024/0378399 A1* | 11/2024 | Gandhi | G06F 16/345 |
| 2024/0379019 A1* | 11/2024 | Naufel | G06N 3/0895 |
| 2024/0386041 A1* | 11/2024 | Erickson | G06F 16/3329 |
| 2024/0394251 A1* | 11/2024 | Brende | G06F 11/3409 |
| 2025/0022100 A1* | 1/2025 | Wu | G06T 5/50 |
| 2025/0036555 A1* | 1/2025 | Brar | G06F 11/3688 |
| 2025/0045338 A1* | 2/2025 | Li | G06F 16/9538 |
| 2025/0063083 A1* | 2/2025 | Grinberg | G06Q 10/06393 |
| 2025/0080561 A1* | 3/2025 | Dayan | H04L 63/20 |
| 2025/0086213 A1* | 3/2025 | Dilipkumar | G06F 16/24522 |
| 2025/0088430 A1* | 3/2025 | Grida Ben Yahya | H04L 41/16 |
| 2025/0103471 A1* | 3/2025 | Bragaia | G06F 11/3684 |
| 2025/0110618 A1* | 4/2025 | Kumar | G06F 40/30 |
| 2025/0110975 A1* | 4/2025 | Shea | G06F 16/3329 |
| 2025/0110979 A1* | 4/2025 | Saligrama Shreeram | G06F 16/3344 |
| 2025/0111151 A1* | 4/2025 | Huang | G06F 40/284 |
| 2025/0111267 A1* | 4/2025 | Huang | G06F 40/30 |
| 2025/0117998 A1* | 4/2025 | Cheng | G06F 40/30 |
| 2025/0147999 A1* | 5/2025 | Lee | G06F 16/353 |
| 2025/0148217 A1* | 5/2025 | Sharifi | G06N 3/0475 |

* cited by examiner

EFFICIENTLY PROCESSING QUERY WORKLOADS WITH NATURAL LANGUAGE STATEMENTS AND NATIVE DATABASE COMMANDS

BACKGROUND

Large language models (LLMs) accept input in the form of natural language prompts and produce output that leverages multiple neural network layers to understand the natural language prompt and respond to the prompt using information from ontologies, dictionaries, and other publicly accessible or mined data sources. LLMs may generate vector embeddings of the natural language prompts, transform the embeddings to inputs of a neural network layer, interpret words, phrases, and linguistic patterns in the text, and focus on a task that is gleaned from the prompt.

The LLMs have access to multiple datasets, some of which may lead to conflicting responses depending on the prompt. The neural network layers of the LLM weigh the information available as such information relates to the prompt, and assemble an answer predicted to gain positive feedback or at least not negative feedback from the users. Many LLMs also inject a degree of randomness or unpredictability into their responses, some of which may be configured. The changing feedback, changing information available and changing popularity of that information, change due to randomness, as well as other underlying changes may cause results to vary from prompt to prompt, even if the prompts are otherwise the same.

Due to the unpredictable nature of LLM responses and the potential for conflicting information in accessible datasets, LLM responses are often used in an advisory manner to promote creativity or personalization with heavy user review and involvement that depends on the use case. This unpredictable nature also makes LLMs difficult to use and rely on in a business context where precise answers are sought. The response provided may be determined from data sources that were not expected by the user, or analyzed in unexpected ways, and the data sources or analysis may not be appropriate for the user's use case.

Users often spend seconds or minutes drafting a prompt for an LLM such as OpenAI's ChatGPT, Cohere, Azure AI, Google PaLM 2, and often wait seconds or minutes more for the LLM to respond to the prompt. The responses often come in a chat-like user interface to the LLM. Due to the extensive information leveraged by LLMs, the multiple neural network layers involved, and the essentially unbounded scope of natural language possibilities, the time and resources required for an LLM to generate a response also make use of LLMs difficult in a high-throughput business environment where answers are often needed at extremely low resource costs within milliseconds or microseconds with perfect or near-perfect accuracy, consistency, and predictability.

LLMs are also open-ended about the information they receive and use to generate responses. If private data is made available to an LLM to answer questions for one user, the LLM may use the private data to answer unexpected questions for another user, potentially in a way that is inconsistent with the security boundaries of the data and potentially leading to public awareness of the private data.

These issues among others make LLMs excellent for creative, time-intensive projects but of limited use for precise, time-sensitive projects.

BRIEF SUMMARY

In some embodiments, a computer-implemented method includes efficiently processing query workloads with natural language statements and/or native database commands. The computer-implemented method may be performed by a specially configured computer system with one or more processors and stored instructions for carrying out the computer-implemented method. The computer-implemented method may also be caused by instructions stored on one or more non-transitory computer-readable media. Such non-transitory computer-readable media may store instructions to be downloaded by a computer system to cause the computer system to perform the computer-implemented method, to be hosted on a network-accessible host for possible use or download, or stored as a result of specially configuring a computer system to perform the computer-implemented method.

The computer-implemented method includes receiving, by a database query processing service operating on one or more computing devices, a first database query comprising one or more commands and one or more conditions that are natively valid for a database query language to retrieve data from one or more database structures that are referenced in the first database query without using a large language model to generate natively valid replacement database query content. If the first database query does not contain a natural language marker, the computer-implemented method further includes causing execution, by the database query processing service, of the first database query to retrieve data from one or more database structures without using a large language model to generate natively valid replacement database query content between receiving the first database query and execution of the first database query.

The computer-implemented method also includes receiving, by the database query processing service, a second database query, and determining, by the database query processing service, that the second database query contains the natural language marker and natural language text. Based at least in part on determining that the second database query contains the natural language marker and the natural language text, the computer-implemented method includes prompting a particular large language model for natively valid replacement database query content based at least in part on the natural language text in the second database query. Based at least in part on the prompting of the particular large language model, the computer-implemented method receives particular database query content generated at least in part by the particular large language model.

The computer-implemented method then determines whether the particular database query content is natively valid for the database query language to retrieve data from one or more particular database structures that are referenced in the particular database query content. Based at least in part on determining that the particular database query content is natively valid for the database query language to retrieve data from the one or more particular database structures that are referenced in the particular database query content, the computer-implemented method causes execution, by the database query processing service, of an operation responsive to the second database query using the particular database query content.

In one embodiment, causing execution, by the database query processing service, of the operation comprises causing execution, by the database query processing service, of the particular database query content to retrieve particular data from the one or more particular database structures, and including the particular data in a response to the second database query.

In the same or a different embodiment, causing execution, by the database query processing service, of the operation comprises providing, by the database query processing service in response to the second database query, the particular database query content and an option to proceed with execution of the particular database query content.

In the same or a different embodiment, causing execution, by the database query processing service, of the operation comprises causing execution, by the database query processing service, of the particular database query content to retrieve particular data from the one or more particular database structures. Causing execution of the operation further comprises prompting a large language model to generate a natural language result explaining the particular data retrieved, and providing, by the database query processing service in response to the second database query, a natural language response based at least in part on the natural language result.

In the same or a different embodiment, the computer-implemented method includes prompting a large language model to generate a natural language result explaining logic of the particular database query content. In this embodiment, causing execution, by the database query processing service, of the operation may include providing, by the database query processing service in response to the second database query, a natural language response based at least in part on the natural language result.

In the same or a different embodiment, the computer-implemented method further includes providing, to the particular large language model, metadata identifying a plurality of data structures including the one or more particular data structures. The metadata is associated with prompting the particular large language model for natively valid database query content based at least in part on the natural language text in the second database query.

In one example, the metadata is stored in association with a profile of a plurality of profiles. Other metadata may be stored in association with at least one other profile of the plurality of profiles. The metadata may identify at least one data structure not identified by the other metadata. In this example, the computer-implemented method further includes, before receiving the first database query or the second database query, receiving a request to set the profile as an active profile in a session of the database query processing service. The first database query and the second database query are received in the session, and the profile remains as the active profile during execution of the first database query and execution of the operation responsive to the second database query in the session.

In the same or a different embodiment, the method further includes providing, to the particular large language model, one or more example natively valid database queries that are not responsive to the second database query. In this embodiment, prompting the particular large language model for natively valid database query content based at least in part on the natural language text in the second database query uses the one or more example natively valid database queries that are not responsive to the second database query.

In the same or a different embodiment, the computer-implemented method further includes receiving a selection of the particular large language model from a plurality of available large language models. The computer-implemented method may include storing credentials for accessing the particular large language model, and prompting the particular large language model for natively valid replacement database query content based at least in part on the natural language text in the second database query may use one or more large language model instructions that are unique to the particular large language model of the plurality of large language models.

In the same or a different embodiment, the computer-implemented method includes, in a session with the particular large language model, prompting the particular large language model to generate a natural language result. The particular large language model is configured to use a prompt history in the session to generate the natural language result, and the natural language result is based at least in part on information provided in one or more past prompts to the particular large language model.

The natural language text may be a first natural language text of multiple natural language texts. The computer-implemented method may further include storing the particular database query content in association with the first natural language text. Then, the database query processing service may receive a third database query that includes the natural language marker and a second natural language text. The computer-implemented method then includes determining that the second natural language text is semantically equivalent to the first natural language text. Based at least in part on determining that the second natural language text is semantically equivalent to the first natural language text, the computer-implemented method causes execution, by the database query processing service, of the particular database query content to retrieve data from the one or more particular database structures without using a large language model to generate natively valid replacement database query content between receiving the third database query and execution of the particular database query content.

In another example where the natural language text is a first natural language text, the computer-implemented method further includes storing a first query template of the particular database query content in association with a first text template of the first natural language text. The first text template includes one or more first placeholders for one or more variables. The first query template includes one or more second placeholders for one or more variables. The computer-implemented method further includes receiving, by the database query processing service, a third database query that includes the natural language marker and a second natural language text, and determining that the second natural language text matches the first text template when one or more particular variables of the second natural language text are replaced with the one or more first placeholders. The computer-implemented method includes substituting the one or more second placeholders in the first query template with the one or more particular variables of the second natural language text to generate second particular query content. Further, the database query processing service causes execution of the second particular database query content to retrieve data from the one or more particular database structures without using a large language model to generate natively valid replacement database query content between receiving the third database query and execution of the second particular database query content.

In various aspects, a system is provided that includes one or more data processors, one or more databases storing a plurality of data structures including data structures that may be referenced by valid native database queries, and a non-transitory computer-readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

As used herein, a "first" query, a "second" query, and a "third" query are not necessarily received or processed in a particular order. The "first" query may be received before, after, or concurrently with the "second" query and/or the "third" query, and processed before, after, or concurrently with the "second" query and/or the "third" query. The terms "first," "second," and "third" are used as naming conventions that allow the queries to be referenced separately in a clear manner.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
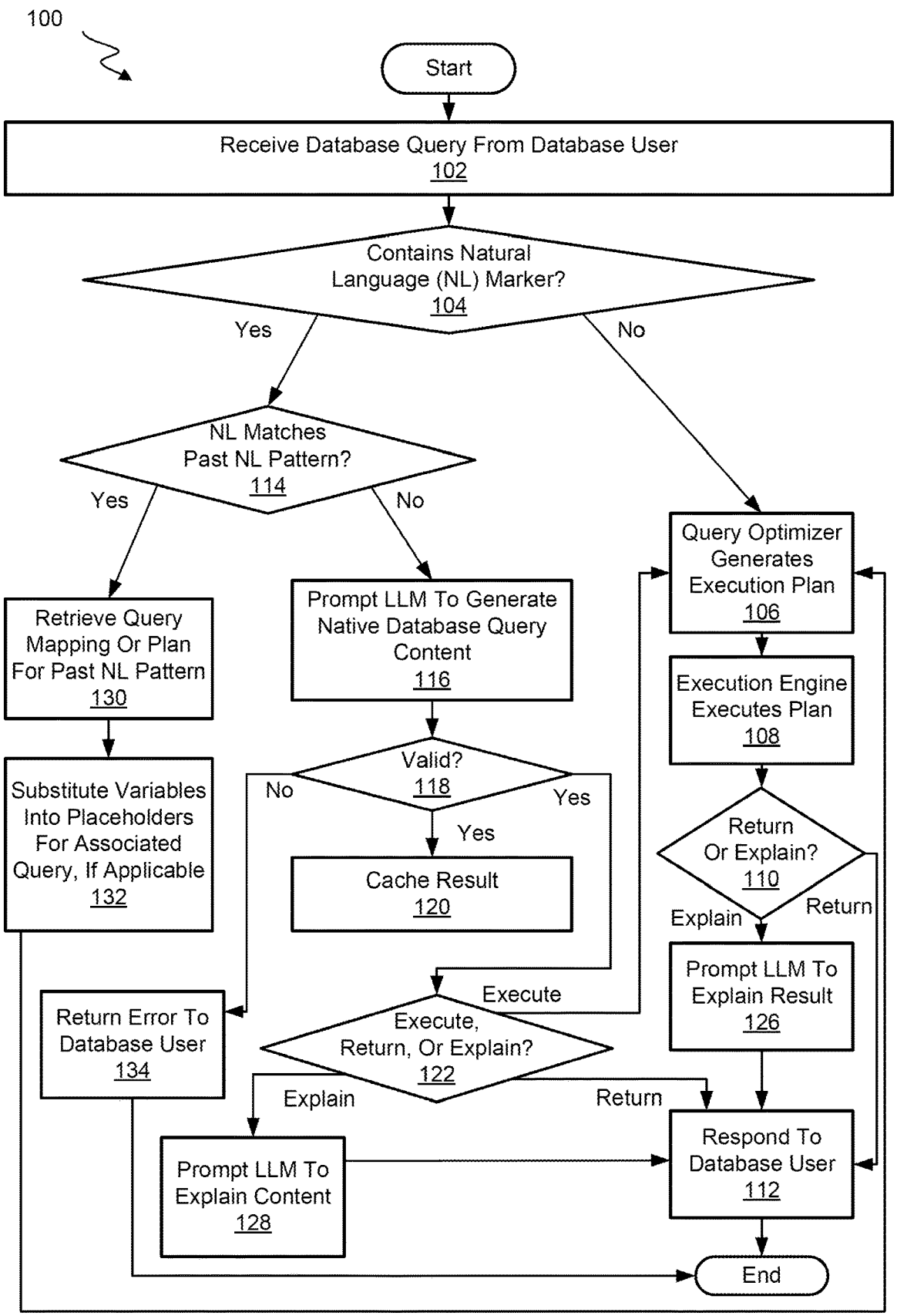
FIG. 1 illustrates a flow chart for processing queries that may contain natural language portions for translation to native database query content.

A database query processing service is provided for efficiently processing query workloads with natural language statements and native database commands. The database query processing service may receive some database queries that do not contain a natural language marker and process these database queries without using large language models to generate replacement query content. The database query processing service may also receive other database queries that do contain the natural language marker and process the other database queries using large language model(s) to generate replacement query content or leverage replacement query content already generated by the large language model(s). The replacement query content is checked to ensure the content is natively valid for the content to retrieve data from database structures referenced in the content. The database query processing service may use the natively valid replacement query content to cause execution of operations responsive to the other database queries.

In various embodiments, the database query processing service is implemented using non-transitory computer-readable storage media to store instructions which, when executed by one or more processors of a computer system, cause processing of the received input to generate some response(s) based on natural language and other response(s) not based on natural language. The database query processing service may be implemented on a local or cloud-based computer system that includes processors and an interface for processing database queries. The computer system may communicate with client computer systems to receive database queries and provide results of the database queries.

A description of the database query processing service is provided in the following sections:
FAST PATH PROCESSING OF DATABASE QUERIES
DETECTING DATABASE QUERIES THAT CONTAIN NATURAL LANGUAGE.
GENERATING QUERY PROMPT FOR LARGE LANGUAGE MODEL
METADATA AND REQUEST PARAMETERS FOR LARGE LANGUAGE MODEL
RECEIVING AND VALIDATING GENERATED QUERY CONTENT OUTPUT
PERFORMING OPERATION(S) USING THE GENERATED CONTENT
RETURNING GENERATED NON-QUERY CONTENT.
SHOWING AND/OR EXPLAINING GENERATED QUERY CONTENT
USING GENERATED QUERY CONTENT FOR QUERY EXECUTION
PROVIDING RESULTS OF QUERY EXECUTION
GENERATING RESULTS PROMPT FOR LARGE LANGUAGE MODEL, AND PROVIDING GENERATED RESULTS CONTENT
CACHING QUERY CONTENT The steps described in individual sections may be started or completed in any order based on the information available as the steps are carried out. The functionality in separate sections may be started or completed in any order that supplies the information necessary to be used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Fast Path Processing of Database Queries

Various database query processing services exist to efficiently process native database queries, such as queries formatted according to any of the various forms of Structured Query Language (SQL), ArangoDB Query Language (AQL), MongoDB Query Language (MQL), Salesforce Object Query Language (SOQL), or Datalog. For example, Oracle Database® receives and processes SQL queries using a variety of optimizations and an efficient architecture that allows a high throughput of queries into the database query processing service and a high throughput of responses out of the database query processing service. The native database query languages are developed to allow database query processing services to perform predictable operations for given commands, optionally maintaining transactional consistency and/or allowing for concurrency in query processing. These predictable operations have been mapped to efficient pathways or execution plans of sub-operations needed to accomplish the given commands in different scenarios against database(s) or underlying data structure(s). For a given query, the database optimizer can select an execution plan of a plurality of available execution plans that each cause sub-operations of the query to be executed in different orders, using different data structures, or otherwise differently. The execution plan is selected using statistics, heuristics, or machine learning to result in a selected execution plan that is predicted to be fastest or most efficient among the plurality of execution plans considered.

When a database query is received that leverages native database query commands, with natively specified constraints and conditions on how the commands are to be processed against database structure(s), the database query processing service uses the efficient pathways for the given commands and conditions to execute the query and provide a response, often with an emphasis on optimizing resource efficiency, response time, accuracy, throughput, and/or transactional consistency. The database query processing service may have a query optimizer and execution engine specially designed with these emphases with respect to given native commands and conditions that are valid for a supported native query language. These native execution pathways for executing commands that perform predictable operations result in high levels of efficiency that result from query optimization and execution innovations targeted at improving these efficiencies of the native query processing pipeline. For this reason, native query execution using native commands and native conditions or constraints on the commands, and referencing native database structures is referred to herein as fast path processing of database queries, which is unencumbered by the translation of less predictable natural language into efficient and predictable native database queries. However, native database query processing is also more rigid than natural language processing in that such widely variant and less predictable natural language statements are not deterministically mapped to native database query commands, constraints, and existing database objects. The intent of natural language may be ambiguous, and determining the intent may involve more resources than just executing the native commands against existing objects.

The database query processing service may handle a hybrid query workload with native database commands as well as with natural language statements. The native database commands may be sent on a fast path for execution, and the natural language statements may be sent to a large language model for further analysis. In one embodiment, the database query processing service operates on computing device(s) to receive one or more database queries comprising command(s) (e.g., select, insert, update, or delete statements), target source(s) (e.g., column(s) specified after the command and/or database structure(s) specified in from clauses), and/or other condition(s) (e.g., filtering conditions in the where clause, such as conditions specified using expressions including Boolean, numeric, or date-based expressions) that are natively valid for a database query language to retrieve data from database structure(s) that are referenced in the one or more database queries without using a large language model to generate natively valid replacement database query content. In one embodiment, a received query may include a command such as "select" and a condition such as a target source or database structure, "salary." In another embodiment, the received query may include a where clause that further specifies that the selected items must have "salary>$30,000".

These one or more queries may be executed using this pathway as they do not contain natural language markers accompanying natural language portions of the queries to transform into database queries. The database query processing service may cause execution of these one or more queries to retrieve data from the database structure(s), for example, based on a query execution plan generated by a query optimizer. The data may be retrieved or accessed without using a large language model to generate natively valid replacement database query content between receiving the one or more database queries and execution of the one or more database queries. No such natively valid replacement database query content is needed for the one or more database queries that do not contain a natural language marker and accompanying natural language portions to transform into database queries.

FIG. 1 illustrates a flow chart of example process 100 for processing queries that may contain natural language portions for translation to native database query content. Process 100 begins in block 102, where a database query is received from a database user. In block 104, a determination is made as to whether the database query contains a natural language marker. In one embodiment, if the natural language marker is not read and evaluated (found) in the query as received, no additional determination is needed to proceed with the fast path for query execution. In block 106, if the received query does not contain a natural language marker, the query optimizer generates an execution plan for executing the query against one or more underlying database structures. In block 108, execution engine executes the plan to, for example, retrieve data from the underlying database structures. Then, in block 110, process 100 determines whether to return or explain the query results. If the results are returned without LLM explanation, process 100 may efficiently conclude to respond to database user in block 112 without utilizing any LLM resources.

If process 100 determines an explanation is requested by the initial query or by the user's query processing settings, process 100 may continue to block 126 to prompt an LLM to explain the query result. Then, in block 112, the database query processing service may respond to the database user with the natural language explanation of the result and/or the result set.

Figure 3:
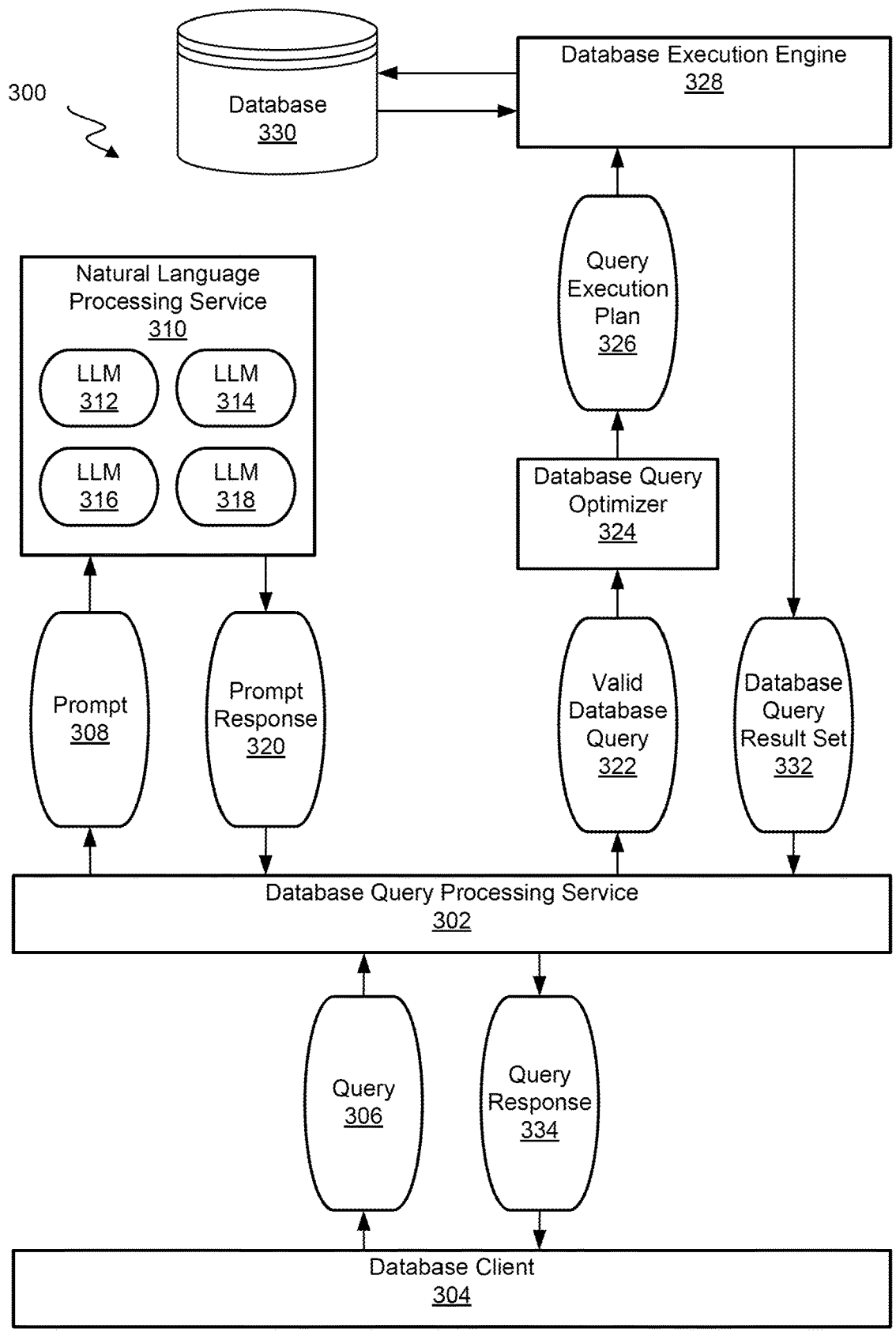
FIG. 3 illustrates a system diagram for a computer system that processes queries that may contain natural language portions for translation to native database query content.

FIG. 3 illustrates a system diagram for a computer system that processes queries that may contain natural language portions for translation to native database query content. As shown, a database client submits query 306 to database query processing service 302. Initial query 306 may be referred to herein as the "received query" or the "initially submitted query." If query 306 is a valid database query, such valid database query 322 may be sent to database query optimizer 324, which generates an execution plan 326 for execution by a database execution engine 328 against database 330. Execution by the database execution engine 328 against database 330 produces a database query result set 332, which may then be included in whole or in part in query response 334 by database query processing service 302.

Detecting Database Queries that Contain Natural Language

In one embodiment, the database query processing service detects a natural language marker in one or more of the queries received. The natural language marker may be any indication in a received query, compliant with a native query language of the received query as understood by the database query processing service, that the received query contains a portion of natural language content. In one example, the marker is a specific keyword or syntax occurring within a database query that conforms to a database query language. For example, the marker may be "AI" as a target of a "select" command, such as "select AI how many employees are in North America?;" or "select AI what are our top 10 streamed movies that were released after 2010?;" In these example, natural language "how many employees are in North America?" and "what are our top 10 streamed movies that were released after 2010" occur after the marker "select AI". Other markers are also possible, such as "select artificial intelligence," "select LLM," "select large language model," "select NL," or "select natural language."

Markers may also be used with commands other than a select statement, such as "find AI," "retrieve LLM," or "answer NL." These compound markers may include a native query command and a target of the native query command. Singular markers may also be used as native to the query language, such as LLM or NLQuestion, without providing any additional target, as long as the database query processing service is configured to understand the singular markers without additional targets of the command being required.

Additional markers may be common terms that occur at the beginning of natural language statements that are otherwise invalid in the native query language but valid for signaling natural language portions, such as keywords associated with questions (e.g., "who," "what," "when," "where," "why," or "how"). For example, a query containing "select * from Employees where Salary>$50,000 and who is the employee with the highest salary?" might be processed to detect one native sub-query "select * from Employees where Salary>$50,000," and one natural language sub-query "who is the employee with the highest salary?" The native subquery may be executed as-is using the native select command and the native references to database structures (signaled by "from") and other conditions (signaled by "where"), and the natural language sub-query may be passed to a large language model to generate a native query that answers the natural language sub-query.

Any markers may be used as long as the query processing service is configured to look for the marker and look for natural language occurring relative to the marker. For example, the natural language may occur immediately after the marker and may be separated by spaces, within quotation marks, within brackets, braces, or parenthesis, with a beginning marker (e.g., a line break or ":") and/or an end marker (e.g., ";" or a line break), etc.

One consideration for choosing an appropriate marker, whether singular (single word or phrase trigger) or compound (multi-word or word pattern trigger), is that the marker does not frequently occur in queries even when natural language processing is not desired. If the marker did frequently occur in queries even when natural language processing was not desired, the marker might lead to natural language processing of content that was not intended to be processed as natural language. Another consideration is that the marker is not onerously long or complicated so that a query author can remember, use, and efficiently transmit the marker when drafting and executing new queries. In various embodiments, the same marker(s) may be used in a database service that supports multiple tenants, such that users across different companies and domains can learn to interact with the database in a consistent manner that goes with the users as they move from company to company and industry to industry.

In one embodiment, the natural language marker is at the beginning of a query or subquery, such as occurring as part of a "select" statement, so that the database query processing service may detect that the natural language marker is being used efficiently without processing other content that occurs in a remainder of the query.

Referring back to FIG. 1, if the database query processing service determines that the received database query contains a natural language marker in block 104, then, in block 114, the database query processing service may determine whether the natural language portion of the received query matches a past natural language pattern. If such patterns are maintained, as described later, the database query processing service may proceed to a fast path execution that does not involve re-prompting the large language model in blocks 130-132 and blocks 106-112. If such patterns are not present or not maintained, the database query processing service may proceed to block 116 to prompt an LLM to generate native database query content. If the native database query content generated is valid, as determined in block 118, the database query processing service may proceed to cache the result in block 120 if patterns of results are maintained by the database query processing service. The database query processing service may also proceed to determine whether the resulting database query content is to be executed, returned, or explained in block 122. If the resulting database query content is to be executed, process 100 may proceed to query optimization in block 106, execution in block 108, and resulting operations in blocks 110-112 to return a result of the query execution to the database user, or blocks 110, 126, and 112 to return an explanation of the query execution results to the database user.

If the resulting database query content is to be returned, process 100 may proceed to return the resulting database query content to the database user in block 112 without computing the database query against the underlying database structures in blocks 106-108.

If the resulting database query content is to be explained, process 100 may proceed to block 128 to prompt an LLM to explain the resulting database query content in natural language in addition or alternative to the query syntax, and return a resulting explanation of the database query content to the database user in block 112 without executing the database query content against underlying database structures in blocks 106-108.

Referring back to FIG. 3, a database client may submit query 306 to database query processing service 302. If query 306 contains a natural language marker and a natural language portion, prompt 308 may be generated to natural language processing service 310, which may include one or more large language models 312, 314, 316, and/or 318 to process the natural language separately, in combination, in series, or in parallel to generate one or more prompt responses 320. Database query processing service 302 selects a prompt response that contains a valid database query 322 to pass to database query optimizer 324. Database query optimizer 324 generates an execution plan 326 for execution by a database execution engine 328 against database 330. Execution by the database execution engine 328 against database 330 produces a database query result set 332, which may then be included in whole or in part in query response 334 by database query processing service 302.

Additional back-and-forth prompts 308s and prompt responses 320s may be performed to explain queries generated by LLMs 312, 314, 316, and/or 318, explain database query result sets 332s, and/or provide responses to natural language inputs without reference to database 330, such as in a chat mode. These additional uses of LLMs will be described later in greater detail.

In a received query such as query 306, the natural language marker may overlap with valid native database queries against valid data structures, in which case a determination may be made about whether the marker is being used to mark natural language or trigger native database query functionality. In one embodiment, after detecting the natural language marker, the database query processing service determines whether or not the target portion of the natural language marker is being used to reference a column of a table stored in the database or some other existing database structure, in which case the database query processing service triggers fast path processing of the database query according to natively understood commands. For example, the database query may include "select ai from skills where region='North America';" to indicate that the value of the "ai" column of the "skills" table should be selected for all rows where the region column is equal to "North America." The database query processing service may detect that the natural language marker's target portion natively references an existing database structure and execute the query rather than passing the query to a natural language processing service, for example, provided by large language model(s).

If the skills table does not exist in the example, the database query processing service may pass the query to the natural language processing service for refinement into a native database query that references existing database structures. Passing queries that cannot be executed as-is to the natural language processing service may help the database query processing service to correct and execute queries that are not initially perfectly formatted or where database structure names are not remembered or are mistyped. In another embodiment, if the database query processing service cannot determine whether the natural language processing service is intended to be invoked or not, the database query processing service may provide an error message in response to the query, indicating that the query is not properly formatted to invoke the natural language processing service but is also not properly formatted for execution against existing database structures. For example, such error message may be triggered when the database query contains "select ai from" as the prefix, unless the structure referenced after "from" is an existing database structure with an existing column name matching the "ai" or target portion of the marker.

For a similar query, "select ai what are the most common skills of my employees in North America;" the database query processing service may detect that the query is not referencing an existing database structure but instead contains natural language. As a result, the query is passed to the natural language processing service to generate a native database query for further processing.

In one embodiment, the database query processing service detects natural language with or without a marker by processing the initial query to determine whether the query content is valid and, if not valid, processing the invalid portion to determine whether it poses a question for a large language model. For example, a large language model could be prompted first to determine whether the invalid portion of the query poses a question and second to determine an answer to the question. Or, one prompt could determine both whether the invalid portion poses a question, and, if so, the answer, which may be in the form of a valid database query to find the answer when executed against a database. In another embodiment, heuristics and/or machine learning are applied to the invalid portion of the query to determine whether the invalid portion contains question-like aspects, such as keywords associated with questions (e.g., "who," "what," "when," "where," "why," or "how"). Any detected natural language sub-query may be passed to a large language model to generate a native query that answers the natural language sub-query.

Such an approach would involve a back-and-forth with either question-determining heuristics or the large language model, possibly after a validity check has already occurred. In another embodiment, certain keywords associated with questions may be used alternatively or additionally to native markers in the query language to serve as marking natural language text in the query even before or without previously performing a validity check. This approach poses some risk, as question terms could otherwise appear in object names of a native query, but may be appropriate in certain implementations where the question terms are not otherwise present in the native queries.

In one embodiment, by using a marker that triggers additional large language model functionality when present and avoids additional large language model functionality when absent, the database query processing service can promote efficiency of query handling for large sets of queries, some of which include the marker and some of which do not include the marker. The queries that do not include the marker are efficiently executed based on the query received, for example, using query optimization (including, for example, query re-writing and execution plan generation) to further improve the efficiency of performing the query and efficiently avoiding a cost of using any large language models to transform natural language into native query content.

Queries that do include the marker are also efficiently executed based on detection of the marker early in the query handling process, and efficient utilization of the large language model(s) and/or a cache of past query content generated by large language models to resolve natural language that is marked in the query as natural language rather than native query content. Replacement native query content may be retrieved from the large language model(s) early in query processing so the replacement native query content may be efficiently executed if needed. This database query processing service architecture promotes efficient utilization of the data structures and processes that make up the large language model(s) as well as the data structures and processes that make up the database query optimizer and database query execution engine.

If the large language model(s) are connected over a network, interaction with the large language model(s) may impose a network connection penalty (for example, 1-200 ms) in terms of the amount of time to send data to the large language model(s) and receive data from the large language model(s). Even if the large language model(s) are managed locally to the database query processing service with minimal connection overhead, interaction with the large language model(s) may involve complex evaluation of natural language using a multi-level neural network that imposes a processing penalty in terms of the amount of time and resources to generate a native database query from natural language input (for example, 1-30,000 ms). Such penalties, if incurred on every database query, could derail the database query processing service and severely limit the otherwise important high-throughput capabilities. Incurring such penalties may be avoided when the database query does not contain a natural language marker, while the benefits provided from the interactions that impose such penalties may be enjoyed when the database query does contain the natural language marker.

In various embodiments, large language model(s) may be prompted with non-deterministic natural language questions, information that is not natively understood by the database query optimizer or execution engine, and/or information that does not reference any underlying database structures, and the large language model(s) may generate query content including deterministic query content, query content that is natively understood by the database query optimizer or execution engine, and/or information that references underlying database structures from which to retrieve data. The generated query content may be efficiently executed by a query execution engine, for example, after query optimization, to retrieve content from underlying database structures referenced in the generated query content, if any.

Generating Query Prompt for Large Language Model

Whether or not the database query workload contains native database queries, based at least in part on determining that a particular database query contains the natural language marker and accompanying natural language text, the database query processing service may generate a prompt to a particular large language model requesting natively valid replacement database query content based at least in part on the natural language text in the particular database query. In one embodiment, the database query processing service provides the prompt to a large language model or natural language processing service. The prompt may include natural language text from the query received by the database query processing service, as well as additional text in the form of a preamble or prefix to the received natural language text or a suffix to the received natural language text, and/or other metadata.

The additional text may include directives passed into the large language model API about producing a database query that is native to a particular database query language such as SQL, or even more specifically SQL compatible to Oracle Database or any other database query language or database provider. The additional text may also include directives to produce a safe translation to a native database query, avoiding malicious native database queries. For example, the directives may instruct the large language model to avoid dynamic markup language (DML) statements or other write operations, or operations that impact database policies, or denial of service attacks that overconsume database resources. The additional text may also be tuned for different large language models to account for different tendencies of the different large language models in generating native database query content.

Figure 4:
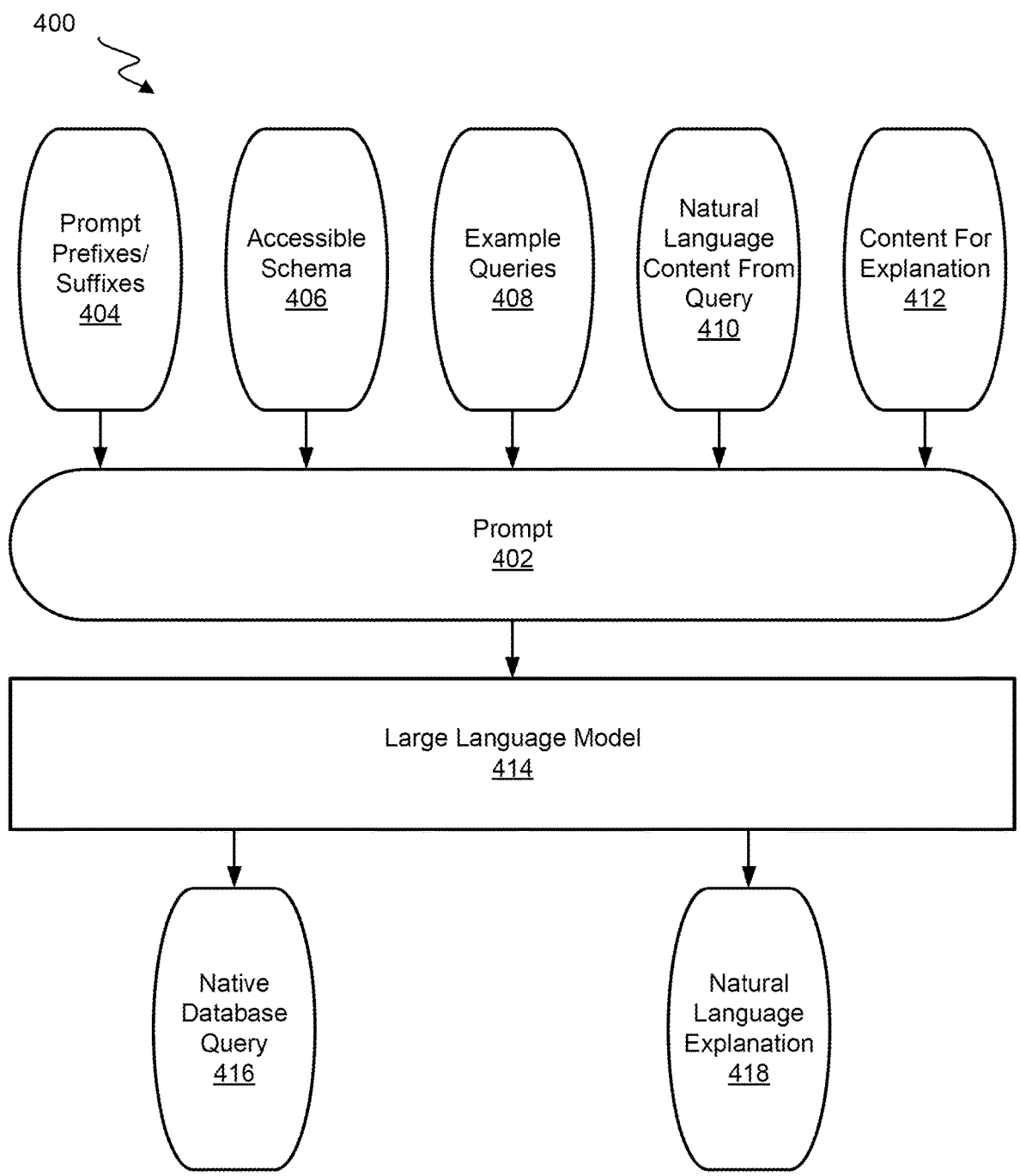
FIG. 4 illustrates a prompt generation pipeline for generating a specialized prompt for a large language model.

FIG. 4 illustrates a prompt generation pipeline 400 for generating a specialized prompt for a large language model. As shown, prompt 402 may be derived from and/or include prompt prefixes and/or suffixes 404, accessible schema 406, examples queries 408, natural language content from the received query 410, and/or content for further explanation 412. Prompt 402 may be fed to large language model 414 to produce native database query 416 and/or natural language explanation 418.

To illustrate an example prompt in more detail, a database query processing service may receive an initial query that includes a natural language marker and natural language "find how many customers." The database query processing service may form different prompts depending on which large language models are used. In a first example, the database query processing service creates the following prompt for an OpenAI large language model:

First Example OpenAI Prompt

```
[
    {
        "role" : "system",
        "content" : "### Oracle SQL tables with their properties:"
    },
    {
        "role" : "system",
        "content" : "# \"ADMIN\".\"CUSTOMERS\" (\"JOIN_DATE\" DATE, \"CUST_ID\" NUMBER, \"SALES\" NUMBER, \"LAST_NAME\" VARCHAR2(30), \"FIRST_NAME\" VARCHAR2(30))"
    },
    {
        "role" : "user",
        "content" : "Always use table alias and easy to read column names, only type Oracle SQL and nothing else to find how many customers"
    }
]
```

In the first example, the schema information and other metadata are included in the prompt. The schema information identifies table names, such as the Customers table, as well as column names and types, such as column CUST_ID with a NUMBER type. In one embodiment, the database query processing service retrieves the available schema information for the user based on one or more roles, profiles, and/or privileges of the user in the database, and determines which objects are available to the user for query execution based on the user's role(s), profile(s), and/or privilege(s). The available tables may then be added to the schema information, optionally in a hierarchical format, which may be marked up as XML or JSON, to show references between objects. The prompt also includes guidance and constraints for the large language model to use when determining the resulting native database query, such as "Always use table alias and easy to read column names," and "only type Oracle SQL and nothing else."

In a second example, the database query processing service creates the following prompt for a Cohere large language model:

Second Example Cohere Prompt

Oracle SQL tables with their properties:

"ADMIN". "CUSTOMERS" ("JOIN_DATE" DATE, "CUST_ID" NUMBER, "SALES" NUMBER, "LAST_NAME" VARCHAR2(30), "STATE" VARCHAR2(30), "FIRST NAME" VARCHAR2(30))

Read the above table description and write an Oracle SQL to answer the following question. Always use table alias and easy to read column names. Do not write anything else except the SQL query.
Question: find how many customers In the second example, the schema information and other metadata are included in the prompt. The schema information identifies table names, such as the Customers table, as well as column names and types, such as column CUST_ID with a NUMBER type. The prompt also includes guidance and constraints for the large language model to use when determining the resulting native database query, such as "Read the above table description and write an Oracle SQL to answer the following question," "Always use table alias and easy to read column names," and "Do not write anything else except the SQL query."

Referring to FIG. 1, the database query processing service prompts a large language model to generate native database query content with the generated prompt in block 116.

Figure 2A:
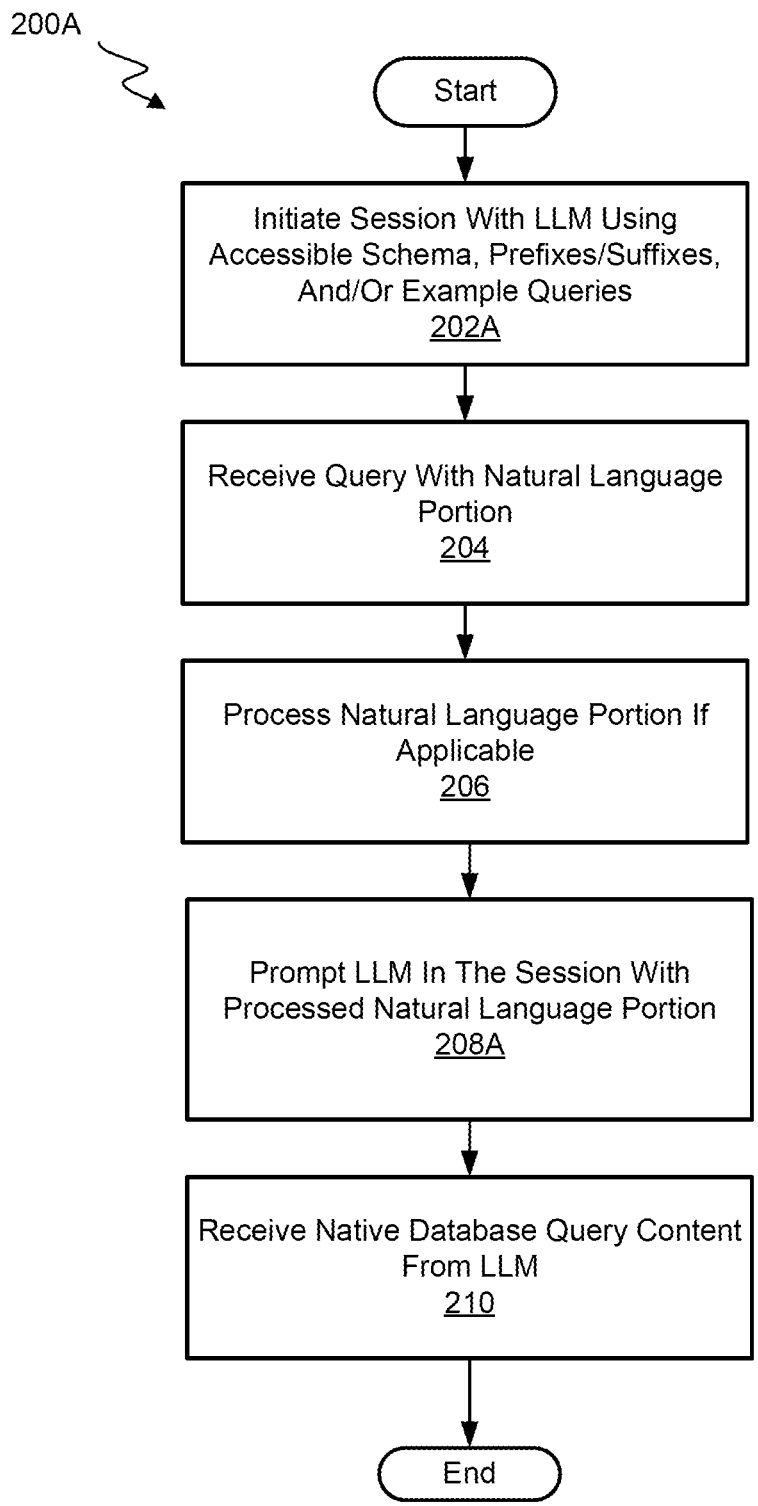
FIG. 2A illustrates a flow chart for handling a natural language portion of a query with a preconfigured large language model session.

FIG. 2A illustrates a flow chart showing example process 200A for handling a natural language portion of a query with a preconfigured large language model session. As shown, in block 202A, a session is initiated with an LLM using accessible schema, prefixes and/or suffixes, and/or example queries. Then, a database query processing service receives a query in block 204 with a natural language portion. The natural language portion is processed and prepared, to correct formatting, spacing, and remove stop words, if applicable, in block 206. In block 208A, the database query processing service prompts an LLM in the session with the processed natural language portion. Process 200A concludes when the database query processing service receives native database query content from the LLM in block 210.

Figure 2B:
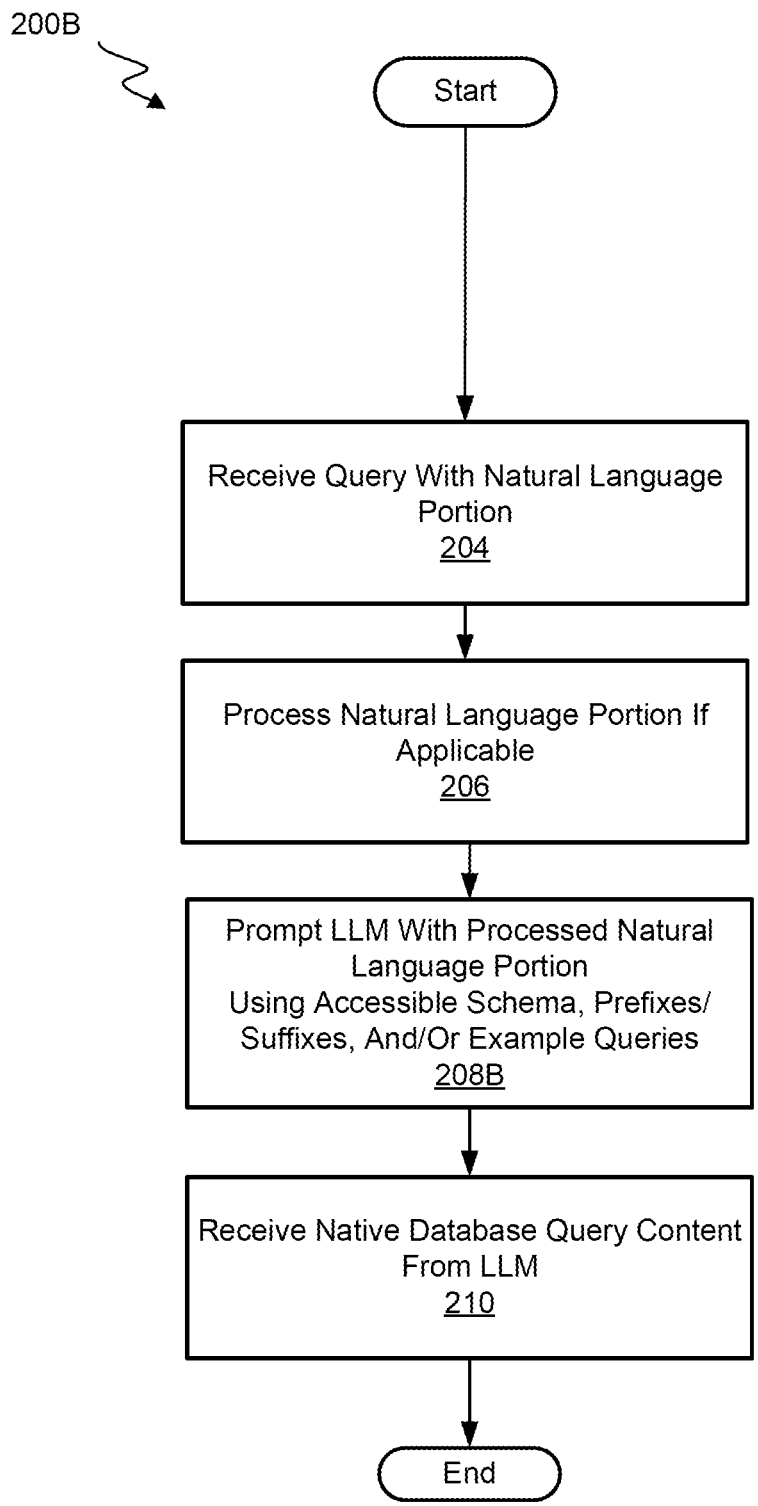
FIG. 2B illustrates a flow chart for handling a natural language portion of a query with a specialized prompt.

FIG. 2B illustrates a flow chart for handling a natural language portion of a query with a specialized prompt. In block 204, a query is received with a natural language portion, which is processed, if applicable, in block 206. Then, in block 208B, the database query processing service prompts an LLM with the processed natural language portion using accessible schema, prefixes and/or suffixes, and/or example queries in the prompt. Process 200B concludes when the database query processing service receives native database query content from the LLM in block 210.

Metadata and Request Parameters for Large Language Model

Beyond the additional text instructions for the large language model relating to the task at hand, the database query processing service may provide, via the large language model API, other metadata about the database object owner names (to disambiguate same-named objects), object names, column names, column aliases (to disambiguate same-named columns, e.g., table.column), time zone information, currency information, column datatypes, comments on tables and columns, database constraints, foreign key relationships, average or aggregate execution times and sizes or cardinality associated with processing different tables, and any training (sample) prompts and corresponding native database queries that have been provided by the user in the profile or otherwise received positive feedback based on past executions of database queries containing native language portions. For example, column names and column datatypes are provided in the first example OpenAI prompt and the second example Cohere prompt above.

The metadata provided to the particular large language model may identify data structure(s), which may include data structure(s) that get referenced when the particular large language model generates resulting native database query content. The data structure(s) may be those data structure(s) that are available to be referenced by the user submitting the initial query, such that the resulting native database query content references those data structure(s) in from clause, specifying where the data is being retrieved from, or the select clause or where clauses, which may specify columns to be returned or other conditions to be placed on those columns, respectively. The metadata provided may be used in the prompt itself or otherwise associated with prompting the particular large language model, such as being stored in association with an active session with the particular large language model.

In various embodiments, metadata may be passed in before or with a prompt to the large language model, including identities of existing database structures such as tables and/or columns, data types, column comments, and other information from a data schema of the database being queried, a native query language to use, example native queries, such as SQL queries, constraints for generated native queries, default groupings, default schema assumptions, etc. For example, the column comments may be passed to the large language model in addition to the table and column names. The column comments may provide information about what the columns mean so the large language model may better map the column name to natural language questions. For example, if the column is "state," the column comments may say "column values are specified in two-digit state codes for any of the 50 U.S. states." As another example, the column comments may say that the region "North America" is stored as "North America." As yet another example, the column comments may say that a "true" value is stored as "1," and a "false" value is stored as "0." Column comments may be manually provided and stored at any time, and/or may be automatically determined based on data types that are valid for and/or used for the column. For example, automatically generated comments may survey all unique values in a column. Automatically generated comments or other column comments may be generated and/or shared with the large language model at the user's discretion, with options specified in the user's profile.

In one embodiment, the data available for metadata to be included in or associated with the prompt depends on permissions of a user who submitted the initial query. For example, a first user with permission to access database structures "contacts, sales, and leads" may submit a first query that contains a natural language marker and natural language. As a result, a large language model may be prompted with metadata identifying a schema including "contacts, sales, and leads." In another example, a second user with permission to access database structures "HR, disputes, contacts, and sales" may submit a second query that contains a natural language marker and natural language. As a result, the large language model may be prompted with metadata identifying a schema including "HR, disputes, contacts, and sales" but not "leads." The large language model may produce results depending on the schema, which may differ depending on which database structures are accessible to the different users.

In one embodiment, the metadata is stored in association with a profile of a plurality of available profiles. Any given profile may be attached to a given request to execute one or more queries, or to a session where such requests may be submitted between a database client and the database query processing service. Other metadata may be stored in association other profile(s) such that the metadata and the other metadata may identify different data structures from each other that are available for querying against depending on which profile is active for the request or session. Before receiving a database query for execution, the database query processing service may receive a request to set the profile associated with the metadata as an active profile in an active session session of the database query processing service. After the profile is the active profile, zero or more other database queries may be received and executed with the profile remaining as the active profile, before a query is received with the natural language marker, triggering actual use of the metadata with a large language model based on the profile being the active profile.

For example, a configuration command may be provided to the database query processing service to configure a session or connection or a specific request within the session with metadata and preferences to use for natural language processing. The configuration of the session may also enable or disable natural language processing altogether, toggling whether natural language portions of queries are processed or not by the database query processing service.

As shown in the example below, the configuration command saves a profile 'movie_nl_processing' with attributes selecting the large language model to use, the credentials to use for authenticating with the large language model, the database structures, objects, tables, or columns listed in the schema, and optionally other variable parameters that may be re-used for different database queries that contain natural language portions. Although one profile is shown, different profiles may exist and be used and re-used in different scenarios. The set profile command also shown below sets the active profile for the session.

```
DBMS_CLOUD_AI.CREATE_PROFILE(
    profile_name => 'movie_nl_processing',
    attributes =>
    '{"provider": "openai",
      "credential_name": "OPENAI_CRED",
      "object_list": [{    "owner": "myschema",
                           "name": "movie"},
                      {    "owner": "myapp"}] }'
);
DBMS_CLOUD_AI.SET_PROFILE('movie_nl_processing');
```

In one example, a configuration command may be provided to the database query processing service in a session or connection with a client to select the particular large language model for use with the natural language of incoming queries on the session, or for given requests, from the client. In the example above, the "openai" large language model provider is chosen with named credentials. The model used may be, for example, gpt-3.5-turbo. Other example providers include, but are not limited to, Cohere, Azure AI, Google PaLM 2, etc. In various other examples, default credentials may be used by the database query processing service. In one embodiment, the credentials include user-specific credentials, such as a user-specific inner session identifier, that allow the LLM service to switch between supporting different users within the same LLM session using the same LLM connection credentials. In this embodiment, context from a given user may be retrieved using the user-specific inner session identifier before processing a natural language query for the given user.

The profile may be modified to set attributes of the profile that change the metadata, configuration, or settings for communicating with the large language model and/or passing metadata to the large language model. The attributes may be set using the SET_ATTRIBUTE command.

The credentials may be stored for accessing the particular large language model. For example, the following configuration command may be provided to the database query processing service in a session with a client to store credentials for the particular large language model for use with the natural language of incoming queries on the session from the client, and the credentials below may be referenced in the example above to establish a connection with the selected large language model provider. The shown credentials include an API key but could also include a username, password, bearer token, or other secret that is used for authenticating with the large language model.

```
DBMS_CLOUD.CREATE_CREDENTIAL (
    'OPENAI_CRED', 'OPENAI', '<api_key>'
);
```

In one embodiment, natural language processing may be initiated from within a database session even without a profile being set. In this embodiment, the database query processing service may use default settings to execute the query.

Security configuration information may be stored for the session that determines whether the session is allowed to execute natural language queries, and, if so, to what extent. Queries containing natural language may have an increased cost in terms of resources used (time, processing power, and money) as compared to native database queries, and users and sessions may be restricted from or empowered to take advantage of these capabilities. Privileges may also be managed on a user-by-user basis, a session-by-session basis, or for the database as a whole to allow external connections to certain large language model(s) for natural language processing, and to accept information provided by the large language model(s) for use in database query processing. The selected large language model(s) may be added to a whitelist for which connections are allowed, and prohibited large language model(s) may be added to a blacklist for which connections are disallowed. Permissions may be checked on execution of the database query containing the natural language marker and natural language, and/or upon activation of a profile specifying natural language query processing metadata and/or preferences.

In one embodiment, a database profile specifying one or more items of metadata and/or preferences with respect to natural language processing may be stored in association with a lightweight or non-persistent session that is loaded by a persistent session in preparation for executing a database query for a specific user or set of users, and another, different database profile specifying other, different items of metadata and/or preferences with respect to natural language processing may be stored in association with another lightweight session that may be loaded by the persistent session in preparation for executing another database query for different specific users or sets of users. In this manner, a client with the persistent session to the database query processing service may swap between lightweight or non-persistent sessions serving different users according to different natural language processing metadata and/or preferences, and the profile information for the non-persistent sessions may be saved and re-loaded when the non-persistent sessions become active in the persistent session. As used herein, a session in this scenario is "persistent" in the sense that the session remains active with the database query processing service even though other non-persistent session data gets loaded and unloaded from the persistent session as the persistent session gets used.

In the same or another embodiment, the database profile specifies one or more items of metadata and/or preferences with respect to natural language processing that may be stored in association with the persistent session. As the persistent session remains up, the database profile settings may remain active and used for queries in the persistent session. When the persistent session ends, the database profile may be saved and re-loaded the next time the persistent session is created between the client and the database query processing service.

In one embodiment, the database query processing service sends one or more items of metadata and/or preferences to the large language model(s) when a session is initiated. In the same or another embodiment, the database query processing service sends one or more items of metadata and/or preferences to the large language model(s) at the time the large language model(s) are prompted to process a natural language portion of a query. The metadata and/or preferences may be persistent at the large language model(s) between queries in the same session between the database query processing service and the large language model(s). In this manner, queries with the same settings may be processed efficiently without re-sending some items of metadata and/or preferences but merely relying on the large language model(s) to re-use the items of metadata and/or preferences if configured to do so.

Prompting one large language model for a natively valid replacement database query content may use different large language model instruction(s) than are used when prompting another large language model for a natively valid replacement database query, even if the initial query triggering the prompt is otherwise the same and the schema is otherwise the same. The prompts may be discovered during the training phase and may provide unique instructions that are helpful to steer individual large language models from observed results that stray from valid database queries that (a) do not address the natural language prompt, or (b) do not result in valid database query content.

In one embodiment, the database query processing service provides, to the particular large language model, one or more example or sample natively valid database queries that are not responsive to the received database query that has been requested to be processed by the database query processing service. The one or more sample natively valid database queries may provide context that is useful for the large language model to generate a natively valid database query that is responsive to the received database query that has been requested to be processed by the database query processing service. In other words, the database query processing service may use the one or more example natively valid database queries that are not responsive to the received query in order to prompt the large language model to generate a response that is responsive to the received query. The example natively valid database queries may be responsive to other past received database queries that are also provided to the particular large language model for guidance on how to generate a natively valid database query to replace natural language from the past received database queries. The past received database queries may reference database structures that are present in the schema, and the past received database queries may provide natural language that the large language model can determine maps to the referenced database structures.

In various embodiments, the large language model is configured to use a prompt history in the session to generate a natural language result. The natural language result may be based at least in part on information provided in one or more past prompts to the particular large language model, such that this context from past prompts helps refine and inform the large language model about what the natural language is requesting and/or how to generate queries compatible with the database environment involved. In one embodiment, the database query processing service prompts a large language model to consider a database session as one large language model conversation and to maintain a history of the past N prompts (e.g., the past 5, 10, or 15 prompts) and responses in the current database session for a specific action. In this embodiment, the natural language translation may be improved with contextual history of prior interactions with the large language model, via prior queries that contained natural language markers and natural language portions.

Receiving and Validating Generated Query Content Output

Based at least in part on the prompting of the particular large language model, the database query processing service may receive particular database query content generated at least in part by the particular large language model. Upon receiving the generated database query content, the database query processing service could pass the database query content on for execution against the database without additional safety and security checks. Alternatively, in one embodiment, the database query processing service determines whether the particular database query content is natively valid for the database query language to retrieve data from one or more particular database structures that are referenced in the particular database query content.

In one embodiment, resulting database query content from a large language model may be validated to determine whether the resulting database query content references database structures that exist and/or are accessible to the user in the database session where the query was submitted. The database query processing service may also validate the query based on whether the query is well-formed according to the query language(s) accepted by the database execution engine, whether the objects referenced in the query are within the scope of the submitting user's privileges, whether the values checked for the referenced objects are valid values for the referenced objects, whether the database operations requested are within the scope of the submitting user's privileges, whether the database operations result in finite non-imaginary results, or whether the resulting database query is more complex or has a higher cardinality than resource usage (return size or processing time) limits imposed on the user or session, etc.

In one example, the resulting database query content may check whether a "state" column value is equal to "California." If the state column value is restricted to two characters, the query will be invalidated as not possibly accomplishing the desired task. This invalidated query may be passed back to the large language model with comments on why the query was invalidated and a prompt for the large language model to correct the generated database query content. Then the corrected database query content may be re-validated. Alternatively, the database query processing service may return an error in response to the received query, indicating that the natural language was not successfully mapped to valid native database query content.

In one embodiment, validation may be performed by a query optimizer that transforms the native database query into operations that reference underlying database structures such that the operations can be executed by a query execution engine. The query optimizer may check that the query is well-formed according to the syntax of the query language, that the referenced structure(s) are accessible to the user, that the results can be retrieved and returned within given resource constraints, without error. In the same or another embodiment, the validation is performed by the query execution engine that uses the order of operations provided by the query optimizer and determines whether any errors are encountered. In the same or another embodiment, the validation is performed by a service layer in front of the query optimizer to ensure that high-level criteria are satisfied, such as referencing data structures that are available to the user and/or using known native query commands.

In some examples, the database query processing service may determine that the database query includes a hallucinated reference to a database object that is not present in the schema accessible to the submitting user. As a result, the database query processing service may request a new database query from the large language model that does not contain the hallucinated reference, and/or may provide a response to the user indicating that the natural language was initially not able to be processed to produce a valid database query. If the database query processing service reverts back to prompting a large language model to fix the database query, for example, with additional metadata identifying why the initial query was invalid, the next resulting query may be valid or invalid. This back-and-forth request-and-validation step may be performed as many times as system or user configurations allow, until limits have been reached or until a valid query is produced.

In one embodiment, even though a valid database query is requested from the large language model, the large language model may produce additional output natural language that is not part of the potentially valid database query. In this embodiment, the database query processing service may detect a beginning and ending of a valid portion of the returned database query and trim the output so the resulting database query to use for further processing, returning, and/or execution is only the portion of the resulting database query that is valid.

Referring back to FIG. 1, in one embodiment, if the database query is not valid, as determined in block 118, the database query processing service may return an error to the user in block 134. The error may indicate the natural language detected, the native query produced, and/or the reason the native query produced is not valid for execution against the database. In another embodiment, if the database query is not valid, the error information may be provided to the large language model for correcting the invalid query in a new iteration of block 116, in which case another determination may be made on whether the resulting database query is valid in block 118. This process may be repeated or may be cut off after N attempts or T time.

Performing Operation(s) Using the Generated Content

In one embodiment, if the database query processing service has determined that the particular database query content from the large language model is natively valid for the database query language to retrieve data from the one or more particular database structures that are referenced in the particular database query content, the database query processing service may cause execution of an operation responsive to the received database query using the particular database query content. Referring to the example of FIG. 1, a responsive operation to perform may be determined in block 122, where a determination is made on whether to execute the plan and, if so, whether to explain a result of execution as determined in block 110, such that the result and/or an explanation of the result may be provided in response to the query in block 112. As another example, a determination may be made in block 122 on whether to explain the generated query content from the LLM in block 128 and, if so, to provide such an explanation in a response to the user in block 112. As yet another example, a determination may be made in block 122 on whether to return the generated query content form the LLM as part of the response in block 112, whether or not such generated query content is also executed. Any of the pathways away from block 122 may be combined together or performed at the exclusion of each other, depending on the preference specified in the received query.

For example, the initial database query may include a specific action requested to be performed on a result of the natural language processing of the marked portion of the initial query. Example operations include, but are not limited to, runsql, narrate, showsql, explainsql, and chat. Any zero or more of these or other operations may be configured as default operations that occur even if they are not specified in the initial query. The runsql operation may return a sql result set of a native query that was generated based on the natural language input from the initial query. The narrate operation may return a conversational result that is based on a sql result set of a native query that was generated based on the natural language input from the initial query. The showsql operation may return a native query that was generated from the natural language input from the initial query. The explainsql operation may return a native query that was generated from the natural language input from the initial query and/or a detailed explanation of the native query that was generated. The chat operation may return a standard natural language output from the natural language input from the initial query without the large language model(s) being prompted to convert the standard natural language output into a database query that is native to a database query language. Three example initial queries are shown below:

Query A: select ai what are our top selling movies?
Query B: select ai narrate what are our top selling movies?
Query C: select ai chat what are the top movies?

In Query A, the default operation may occur since no other operation is specified. For example, if the default operation is runsql, the database query processing service may return the following example result of an executed query based on the natural language:

| Query A Result | |
|---|---|
| Movie Title | Total Sales |
| Aladdin | 82426.71 |
| Aquaman | 78091.19 |
| Captain Marvel | 76146.21 |
| The Lion King | 66606.75 |
| Spider-Man: Far From Home | 66516.26 |

In Query B, the operation specified is narrate. Accordingly, instead of returning the result above, the database query processing service may input the result above into a large language model to convert the result into a natural language output, as shown below.

Query B Result
 "Here is a breakdown of total sales for different movies:
  Aladdin: $82,426.71
  Aquaman: $78,091.19
  Captain Marvel: $77,146.21
  The Lion King: $66,606.75
  Spider-Man: Far From Home: $66,516.26
These figures likely represent the box office sales or revenue generated by each respective movie. It's a straightforward representation of the financial success of these films in terms of box office performance."

In Query C, the operation specified is chat. Accordingly, instead of returning a database query content that depends on data stored in a database, the large language model is being asked to return natural language content based on the large language model's knowledge from the world. The database query processing service may refrain from sending metadata and preferences associated with producing a native database query response when the chat operation is carried out. In one embodiment, the database query processing service uses a large language model session with no metadata or preferences specified. In another embodiment, the database query processing service uses a large language model session with chat preferences specified that are different than native query response preferences. Here is an example output in response to Query C using the chat operation:

"Here are some widely acclaimed and popular films across different genres:
Drama: 'The Shawshank Redemption'
Pros: Gripping storyline, well-developed characters.
Cons: Some may find it emotionally intense.
Science Fiction: 'Blade Runner 2049'
Pros: Visually stunning, thought-provoking themes.
Cons: Pacing might be slow for some viewers.
Action/Adventure: 'Mad Max: Fury Road'
Pros: Intense action sequences, unique post-apocalyptic setting.
Cons: Limited character development.
Comedy: 'The Grand Budapest Hotel'
Pros: Quirky humor, visually engaging.
Cons: Humor style may not suit everyone.
Animated: 'Toy Story 3'
Pros: Heartwarming story, impressive animation.
Cons: Some might find it emotionally intense.

Returning Generated Non-Query Content

The above results show non-query content returned as a result of processing natural language from a query using the chat operation. The results may also be stored in the database directly and later queried without use of the large language model. In the case of chat input, the client may choose to persist the result in a database structure for comparison with other data stored in the database structures. In this way, clients may compare data from their private database structures with data from the real world and/or make adjustments to their processes to account for the real-world data added from the chat or other natural language result functionality in database queries.

Non-query content may be requested and returned by natural language in some sub-queries, while query content may be requested and returned by natural language in other sub-queries, and/or query results may be requested and returned by native query commands in other sub-queries, any of which may be submitted together in a single request for query execution to the database query processing service.

Showing and/or Explaining Generated Query Content

In one embodiment, the database query processing service causes execution of the operation by providing, in response to the received database query, the particular database query content and an option to proceed with execution of the particular database query content. The option to proceed may be selected by the user, causing a responsive command to the database query processing service to trigger execution of the particular database query content that was previously generated.

The database query processing service may prompt a large language model to generate a natural language result explaining logic (e.g., commands, targets, and/or other conditions) of the particular database query content. The natural language result generated by the large language model may be provided by the database query processing service in response to the received query.

In one embodiment, returned database query content expected to take longer than a threshold amount of time or using more than a threshold amount of resources (cpu, storage, network bandwidth, and/or financial cost) is returned back to the user for evaluation even if the user initially opted, via the syntax of the initial query, to execute the database query content. User preferences and settings may set caps or limits for execution times of automatically generated queries, such that automatically generated queries exceeding the caps are first provided back to the user before automatic execution of the automatically generated queries. On the other hand, even with this preference specified, automatically generated queries not exceeding the caps may be automatically executed after being automatically generated.

Using Generated Query Content for Query Execution

In one embodiment, as shown in block 108 of FIG. 1, the query content generated by a large language model may be executed against a database, for example, after an execution plan is generated in block 106. Executing the query may cause the execution engine to retrieve particular data from the one or more particular database structures, and including the particular data in a result set to be included in a response to the received database query.

In one embodiment, a query optimizer generates an execution plan and sends the execution plan to a database execution engine prior to execution against underlying database structures. The execution plan may take a logically formulated query in native database query language and select which database structures to access to compute the logically formulated query, as well as what order to access those structures. For example, a query may be executable against a larger database table or a smaller index of the larger database table, each pathway producing semantically equivalent results. Results are semantically equivalent if they equally satisfy the less precise constraints of the logically formulated query, even if they are not precisely the same. In many scenarios, the query optimizer may choose to execute the query against the smaller index to reduce the amount of data processed. However, in some scenarios, the query optimizer may choose to execute the query against the larger database table if much of the information from the larger database table is needed to complete query execution. If the initial query does not specify an order for results, results may be generated and provided in a response in different orders depending on which order is predicted to be most efficient to gather from the underlying database structures.

In one embodiment, optimizing the query content includes re-ordering operations while preserving semantic equivalence of the result. The re-ordering may be done to promote more efficient processing and handling or processing of potentially fewer rows ("lower cardinality") during execution. For example, a natural language portion of an initial query may ask a question that requires information to be joined from three different tables of different sizes. The large language model may construct a query that has little knowledge of the table sizes and optimal join order. The time and resources consumed by the query may depend on the join order, and the optimizer can determine the best join order based on the sizes of the tables so that the large tables are filtered down to a small number of rows before further processing and the smaller tables may be handled first without a similar benefit of filtering due to the join operation. Without using the optimizer and knowledge of execution times, table sizes, and semantically equivalent rewrite operations, the large language model may produce a suboptimal query that gets transformed by the optimizer using this additional information prior to execution.

Providing Results of Query Execution

Referring back to FIG. 1, results may be provided in a response to the database user in block 112. The results may include generated query content, an explanation of generated query content, results from execution of generated query content, an explanation of results from execution of query content, results from a received native database query, an explanation of results from a received native database query, and/or any other output generated from the large language model such as conversational output. The results may be provided in a message back to the user or client who submitted the initial query, and the message may be transmitted in a database session or some other connection between the user or client and the database query processing service.

Generating Results Prompt for Large Language Model, and Providing Generated Results Content In one embodiment, the database query processing service causes execution of the generated database query content to retrieve particular data from one or more particular database structures in the database and further prompts a large language model to generate a natural language result explaining the particular data retrieved. The natural language result explaining the particular data retrieved is generated in example block 126 of FIG. 1, and may be provided as part of a natural language response to the query in example block 112 of FIG. 1.

In one embodiment, the database query processing service receives the initial database query from a database user (e.g., an application interacting with the database or a human user) containing natural language and prompts, in an initial prompt with included metadata, a large language model to generate native database query content. The database query processing service receives native database query content from the large language model, validates that the native database query content accesses only those database structures that the database user is allowed to access and validates that the database query content is well-formed syntactically, and, if so, executes the database query content to retrieve data from one or more referenced database structures. If non-null data is retrieved, the database query content results may then be passed back as a second prompt into a large language model, which may be the same or a different large language model as used for the initial prompt, with same or different metadata as the initial prompt. The second prompt may ask the large language model to explain the database query content results in the natural language rather than returning native database query content. Whether or not session history is enabled with the large language model, the second prompt may further inform the large language model in the prompt that the initial prompt was previously provided and that the database query content results were determined to be a response to the initial prompt, as part of asking the large language model to explain the database query content results. The database query content results may be passed into the large language model using the second prompt to generate a natural language explanation of the results row-by-row, as a whole, or in other defined sections. The natural language result explaining the database query content results may be returned to the database user in response to the initial database query.

In one embodiment, the database query processing service automatically determines whether to ask for row-by-row results, results as a whole, or other descriptions of the results based on the results generated by execution of the database query against the database structures. For example, a summary of the results as a whole may be requested for a large result with hundreds of rows; a row-by-row analysis explaining the meaning of each data value in each column for each row of data may be requested for a result with a medium result with several rows; and an in-depth analysis may be requested for a small result with only one or two values, to provide a richer meaning to the values themselves. In another embodiment, a combination of explanations may be requested, such as a summary followed by a row-by-row analysis. These settings may be adjusted in the user's profile based on what types of explanations the user prefers for data sets with different sizes and characteristics.

Caching Query Content

In various embodiments, database query content may be generated by large language models and cached in association with information about the initial natural language that caused generation of the database query content. The cached database query content may then be re-used when similar natural language is detected in the future. Referring to FIG. 1, a determination is made in block 114 on whether the natural language in the received query matches a past natural language pattern. If so, process 100 proceeds to block 130, where a query mapping or plan is retrieved for the past natural language pattern. Then, in block 132, variables may be substituted into placeholders for the associated query, if the matched natural language pattern and corresponding database query content have been stored with placeholders. Then, query execution may proceed in block 108 if a query execution plan was also cached or block 106 if the query execution plan is not yet available.

In one embodiment, the database query processing service stores the particular database query content in association with a first natural language text. The database query processing service may then receive another database query that includes the natural language marker and a second natural language text. The database query processing service then determines whether the second natural language text is semantically equivalent to the first natural language text. Based at least in part on determining that the second natural language text is semantically equivalent to the first natural language text, the database query processing service may cause execution of an operation, such as execution of the particular database query content to retrieve data from one or more particular database structures without prompting a large language model for natively valid replacement database query content between receiving the other database query and execution of the particular database query content.

As new queries are received, the new queries may be matched to one or more existing templates based on natural language portions that have already been converted into native database queries. If a new query matches an existing template, instead of prompting the large language model for a new answer, the database query processing service may retrieve a native database query corresponding to the natural language portion with placeholders.

In one embodiment, the database query processing service stores a first query template of the particular database query content in association with a first text template of the first natural language text. The first text template may include one or more first placeholders for one or more variables, and the first query template may include one or more second placeholders for one or more corresponding variables. The database query processing service may then receive another database query that includes the natural language marker and a second natural language text. The database query processing service then determines whether the second natural language text matches the first text template when one or more particular variables of the second natural language text are replaced with the one or more first placeholders. Upon finding a match, the database query processing service may substitute the one or more second placeholders in the first query template with the one or more particular variables of the second natural language text to generate the second particular query content. The database query processing service may then cause execution of an operation, such as execution of the second particular database query content to retrieve data from one or more particular database structures without prompting a large language model for natively valid replacement database query content between receiving the other database query and execution of the second particular database query content.

In one embodiment, the natural language statement is canonicalized, normalized, or otherwise simplified prior to caching. For example, extra whitespaces may be removed, and language from a list of stop words or stop phrases that is known to not impact results may be removed, such as "please," "would you," "my," and "our". If none of these unnecessary complexities are present, the simplified natural language statement may be the same as the initial natural language statement. The database query processing service may cache the simplified natural language statement for matching against future simplified versions of received natural language statements.

In one embodiment, the simplified natural language statement is a template that further removes one or more variables from the initial natural language statement and/or the generated database query content mapped to the initial natural language statement. For example, numerical variables may be detected to not impact the syntax of the generated native database query content, and placeholders may be substituted for these numerical variables in both the initial natural language statement and the generated database query content, for caching purposes. The placeholders may be associated with a valid replacement data type, such as a number, variable characters, or Boolean value. One additional benefit of placeholders is that they often consume less space in storage than the actual value being replaced. An example placeholder that may be used to replace values and refer to the underlying value at a location in memory is a bind variable.

For example, the following initial query and resulting native database query content from the initial query may be cached in the cached form shown below, which includes placeholders [NUM1] and [NUM2] for two numbers that occur in the initial query. The cached natural language portion further excludes extra spaces and the keyword "my," which is irrelevant additional text that may appear in a list of stop words to remove.

Natural Language Portion of Initial Query
    find my employees in sales division 3 more than 10 years
Resulting Native Database Query Content from Initial Query
    select * from emp where division=3 and tenure>10
Cached Natural Language Portion of Initial Query
    find employees in sales division [NUM1] more than [NUM2] years
Cached Resulting Native Database Query Content from Initial Query
    select * from emp where division=[NUM1] and tenure>[NUM2]

After the initial query is cached, a subsequent query may be received as shown below. The subsequent query may be processed by the database query processing service to remove any stop words, such as "our," and to map any potential numerical or other variables to placeholders for matching purposes, such as "5" and "4" in the example. Although the numbers are removed, the database query processing service stores the variables NUM1=5 and NUM2=4 in the background during the matching process. For example, the placeholders may be bind variables that refer to the memory address where the actual value is retained. The processed version of the natural language portion of the subsequent query may be matched to the cached natural language portion of the initial query. As a result, instead of prompting a large language model or instead of waiting for the large language model to produce a result (if the large language model was already prompted), the cached resulting native database query content from the initial query is used to determine the resulting native database query content from the subsequent query, as shown below. The numerical value assigned to the NUM1 placeholder from the processed version of the natural language portion of the subsequent query and the numerical value assigned to the NUM2 placeholder from the processed version of the natural language portion of the subsequent query are substituted for the placeholders in the cached resulting native database query content from the initial query to produce the resulting native database query content from the subsequent query below.

Natural Language Portion of Subsequent Query
    find our employees in sales division 5 more than 4 years
Processed Version of Natural Language Portion of Subsequent Query
    find employees in sales division [NUM1] more than [NUM2] years
Resulting Native Database Query Content from Subsequent Query
    select * from emp where division=5 and tenure>4

Results from natural language processing by the large language model may be cached for any of the operations requested, whether chat operations, explaining query functionality, describing a result set, or generating a native database query based on natural language input. Results from using natural language to generate a native database query may be cached and re-used even if the underlying operations performed on the generated native database query (return the generated query to the user, execute the generated query, explain the generated query, or execute the generated query and explain the result) are different. After these results have been produced once and cached by the database query processing service, any of these results may be retrieved when similar prompts are received by the database query processing service, without requiring a back-and-forth round trip with the large language model.

In one embodiment, a cache of results may be enabled or disabled for a given query, or in the preferences for a session. For example, if natural language in a query is asking for "a different list of top movies," the cache may be disabled for the natural language processing so the result is different each time rather than being different one time and the same each subsequent time. The cache may be automatically disabled for queries that are prompting the large language model for "different" or "unique" results. In another example, the cache may be disabled or enabled by default for the session via a profile saved for the session. In yet another example, the cache may be enabled or disabled for a given query by passing a parameter into the query. For example, "select ai use_cache=false what is a different list of top movies?" may provide a different list each time with no caching, based on the passed in parameter readable by the database query processing service.

In one embodiment, the data available for metadata to be included in or associated with the prompt depends on permissions of a user who submitted the initial query, and similarly the data to be re-used in the cache depends on whether the data is cached in association with the same metadata. For example, a first user with permission to access database structures "contacts, sales, and leads" may submit a first query, and a second user with permission to access database structures "HR, disputes, contacts, and sales" may submit a second query. Because the first and second queries involve different data structures, in one embodiment, the results of the first query are not cached and re-used to produce results of the second query. In another embodiment, if the first query asked a question that produced a native database query that referenced only "contacts" and "sales" objects, and not "HR", "disputes," or "leads" objects, then the first query may be cached and re-used for the second query because the information used for the query includes data structures that are overlapping between the two users and does not include any data structures that are not overlapping between the two users.

In one embodiment, the cached mappings between natural language portions and resulting database query content may include a minimum required schema associated with each of the mappings. If the schema is the same between different tenants, customers, or users, cached mappings between natural language portions and resulting database query content may be used between tenants. For example, a first query submitted by a first tenant, customer, or user with a particular schema including a particular one or more database objects of a first database may be used to generate a cached natural language portion that was used to generate native database query content that references the particular one or more database objects of the first database. A second query may be submitted by a second tenant, customer, or user with the same particular schema referencing the particular one or more database objects but such that exist in a second database of the second tenant rather than the first database of the first tenant. Although the particular one or more database objects have the same name, they exist in a different database and likely contain different data. The database query processing service may detect that natural language of the second query matches the cached natural language portion from the first query. The database query processing service may then use the generated native database query content from the first query to execute the generated native database query content against the second database and retrieve a result specific to the second database and the second tenant using the generated native database query that was cached for the first tenant. This avoids a round-trip with the large language model and has the same result if the referenced portions of the schema, or referenced database objects, otherwise have the same name and structure between the tenants, customers, or users.

If the database structures are different for different tenants, customers, or users, rather than re-using the cached version of the previously generated database query content, the database query processing service may newly generate database query content to determine a new generated database query that is specific to the different schemas of the different tenants, customers, or users.

In one embodiment, query execution plans are generated, including query optimization, for a query template before bind variables are replaced with values. In this embodiment, query execution plans that result from a query optimization and plan generation process may be re-used between templates that have the same bind variables, resulting in improved efficiency. Once the plan is generated or retrieved, values for the bind variables may be substituted in the plan for execution.

Computer System Architecture

Figure 5:
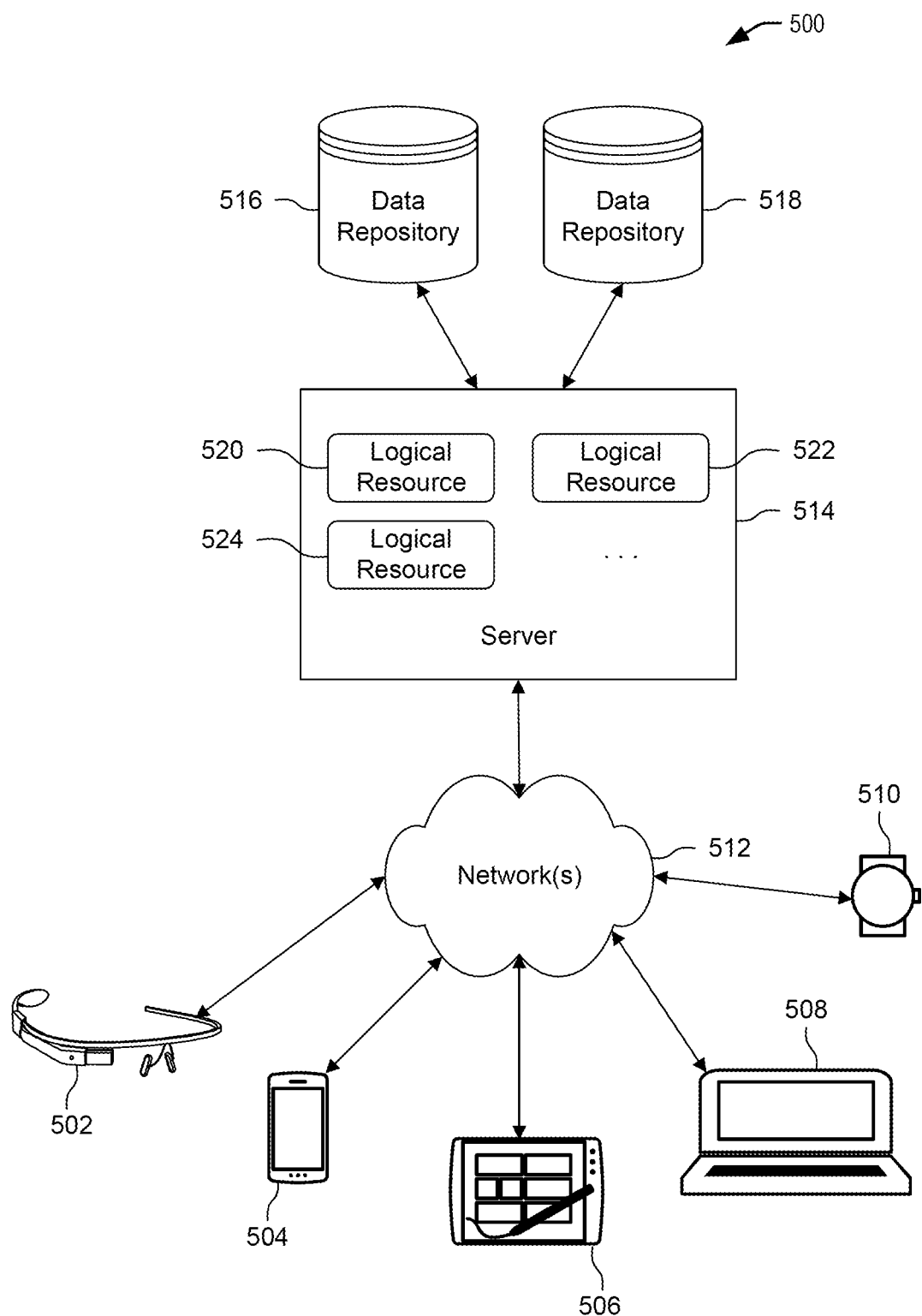
FIG. 5 depicts a simplified diagram of a distributed system for implementing certain aspects.

FIG. 5 depicts a simplified diagram of a distributed system 500 for implementing an embodiment. In the illustrated embodiment, distributed system 500 includes one or more client computing devices 502, 504, 506, 508, and/or 510 coupled to a server 514 via one or more communication networks 512. Clients computing devices 502, 504, 506, 508, and/or 510 may be configured to execute one or more applications.

In various aspects, server 514 may be adapted to run one or more services or software applications that enable techniques for efficiently processing query workloads with natural language statements and native database commands.

In certain aspects, server 514 may also provide other services or software applications that can include non-virtual and virtual environments. In some aspects, these services may be offered as web-based or cloud services, such as under a Software as a Service (SaaS) model to the users of client computing devices 502, 504, 506, 508, and/or 510. Users operating client computing devices 502, 504, 506, 508, and/or 510 may in turn utilize one or more client applications to interact with server 514 to utilize the services provided by these components.

In the configuration depicted in FIG. 5, server 514 may include one or more components 520, 522 and 524 that implement the functions performed by server 514. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, 508, and/or 510 for techniques for efficiently processing query workloads with natural language statements and native database commands in accordance with the teachings of this disclosure. A client device may provide an interface that enables a user of the client device to interact with the client device. The client device may also output information to the user via this interface. Although FIG. 5 depicts only five client computing devices, any number of client computing devices may be supported.

The client devices may include various types of computing systems such as smart phones or other portable handheld devices, general purpose computers such as personal computers and laptops, workstation computers, smart watches, smart glasses, or other wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, Apple Watch®, Meta Quest®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 512 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 512 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 514 may be composed of one or more general purpose computers, specialized server computers (including, by way of example, PC (personal computer) servers, UNIX® servers, mid-range servers, mainframe computers, rack-mounted servers, etc.), server farms, server clusters, a Real Application Cluster (RAC), database servers, or any other appropriate arrangement and/or combination. Server 514 can include one or more virtual machines running virtual operating systems, or other computing architectures involving virtualization such as one or more flexible pools of logical storage devices that can be virtualized to maintain virtual storage devices for the server. In various aspects, server 514 may be adapted to run one or more services or software applications that provide the functionality described in the foregoing disclosure.

The computing systems in server 514 may run one or more operating systems including any of those discussed above, as well as any commercially available server operating system. Server 514 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 514 may include one or more applications to analyze and consolidate data feeds and/or event updates received from users of client computing devices 502, 504, 506, 508, and/or 510. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 514 may also include one or more applications to display the data feeds and/or real-time events via one or more display devices of client computing devices 502, 504, 506, 508, and/or 510.

Distributed system 500 may also include one or more data repositories 516, 518. These data repositories may be used to store data and other information in certain aspects. For example, one or more of the data repositories 516, 518 may be used to store information for techniques for efficiently processing query workloads with natural language statements and native database commands. Data repositories 516, 518 may reside in a variety of locations. For example, a data repository used by server 514 may be local to server 514 or may be remote from server 514 and in communication with server 514 via a network-based or dedicated connection. Data repositories 516, 518 may be of different types. In certain aspects, a data repository used by server 514 may be a database, for example, a relational database, a container database, an Exadata storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 516, 518 may also be used by applications to store application data. The data repositories used by applications may be of different types such as, for example, a key-value store repository, an object store repository, or a general storage repository supported by a file system.

In one embodiment, server 514 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 6:
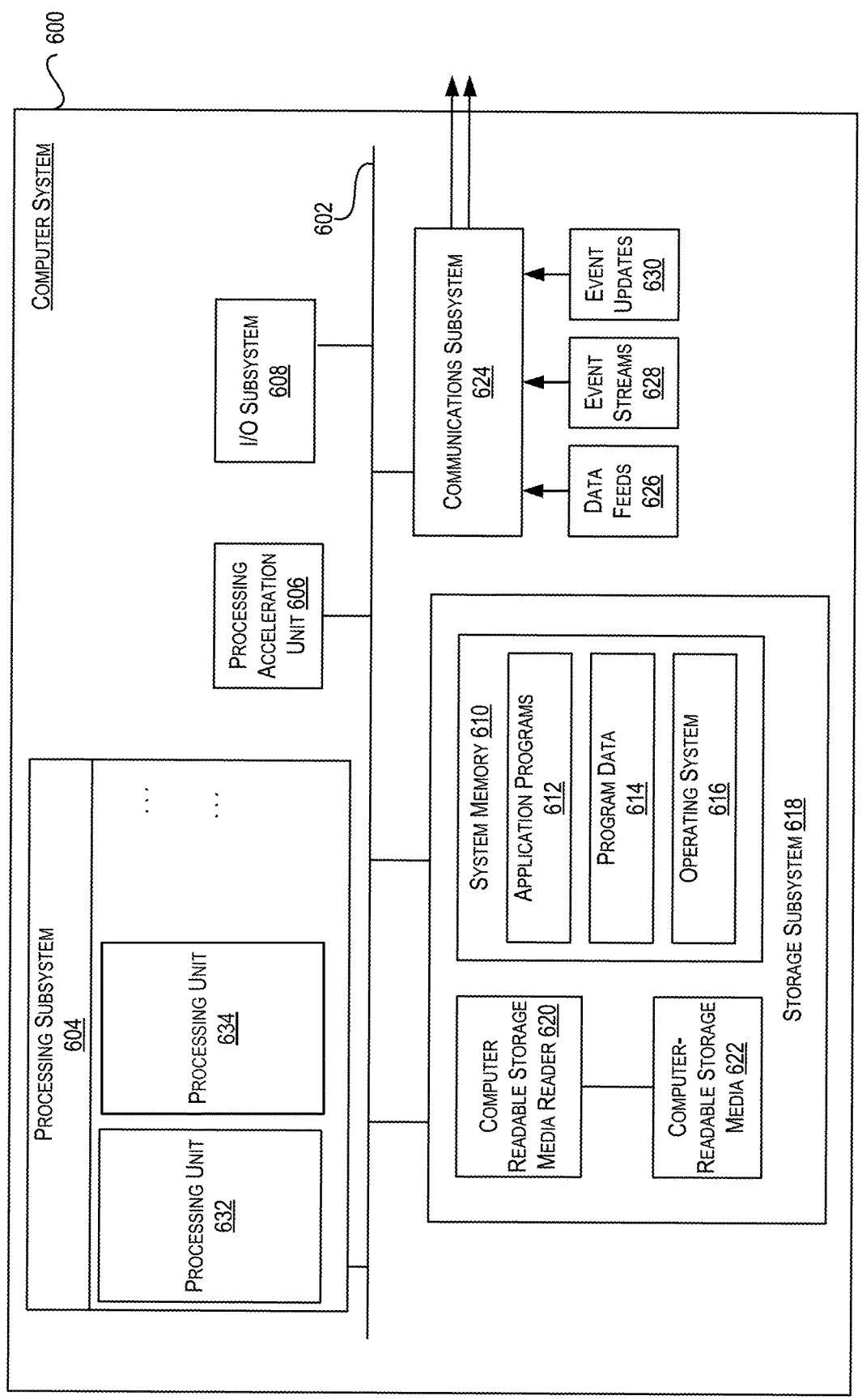
FIG. 6 illustrates an example computer system that may be used to implement certain aspects.

FIG. 6 illustrates an exemplary computer system 600 that may be used to implement certain aspects. For example, in some aspects, computer system 600 may be used to implement any of the system 100 for enriching log records with fields from other log records in structured format as shown in FIG. 1 and various servers and computer systems described above. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include non-transitory computer-readable storage media including storage media 622 and a system memory 610.

Bus subsystem 602 provides a mechanism for letting the various components and subsystems of computer system 600 communicate with each other as intended. Although bus subsystem 602 is shown schematically as a single bus, alternative aspects of the bus subsystem may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processors, application specific integrated circuits (ASICs), or field programmable gate arrays (FPGAs). The processors may include be single core or multicore processors. The processing resources of computer system 600 can be organized into one or more processing units 632, 634, etc. A processing unit may include one or more processors, one or more cores from the same or different processors, a combination of cores and processors, or other combinations of cores and processors. In some aspects, processing subsystem 604 can include one or more special purpose co-processors such as graphics processors, digital signal processors (DSPs), or the like. In some aspects, some or all of the processing units of processing subsystem 604 can be implemented using customized circuits, such as application specific integrated circuits (ASICs), or field programmable gate arrays (FPGAs).

In some aspects, the processing units in processing subsystem 604 can execute instructions stored in system memory 610 or on computer readable storage media 622. In various aspects, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above. In instances where computer system 600 is executing one or more virtual machines, one or more processing units may be allocated to each virtual machine.

In certain aspects, a processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 600 to a user or other computer. User interface output devices may include a display subsystem, indicator lights, or non-visual displays such as audio output devices, etc. The display subsystem may be a cathode ray tube (CRT), a flat-panel device, such as that using a light emitting diode (LED) display, a liquid crystal display (LCD) or plasma display, a projection device, a touch screen, a computer monitor and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some aspects. Storage subsystem 618 may store software (e.g., programs, code modules, instructions) that when executed by processing subsystem 604 provides the functionality described above. The software may be executed by one or more processing units of processing subsystem 604. Storage subsystem 618 may also provide a repository for storing data used in accordance with the teachings of this disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 622 may store programming and data constructs that provide the functionality of some aspects. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, digital video disc (DVD), a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 618 may also include a computer-readable storage media reader 620 that can further be connected to computer-readable storage media 622. Reader 620 may receive and be configured to read data from a memory device such as a disk, a flash drive, etc.

In certain aspects, computer system 600 may support virtualization technologies, including but not limited to virtualization of processing and memory resources. For example, computer system 600 may provide support for executing one or more virtual machines. In certain aspects, computer system 600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices. For example, the communication subsystem may be used to transmit a response to a user regarding the inquiry for a Chabot.

Communication subsystem 624 may support both wired and/or wireless communication protocols. For example, in certain aspects, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 624 can provide wired network connectivity (e.g., Ethernet) in addition to or instead of a wireless interface.

Communication subsystem 624 can receive and transmit data in various forms. For example, in some aspects, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
   receiving, by a database query processing service operating on one or more computing devices, a first database query comprising one or more commands and one or more conditions that are natively valid for a database query language to retrieve data from one or more database structures that are referenced in the first database query without using a large language model to generate natively valid replacement database query content, wherein the first database query does not contain a natural language marker;
   causing execution, by the database query processing service, of the first database query to retrieve data from one or more database structures without using a large language model to generate natively valid replacement database query content between receiving the first database query and execution of the first database query;
   receiving, by the database query processing service, a second database query;
   determining, by the database query processing service, that the second database query contains the natural language marker and natural language text;
   based at least in part on determining that the second database query contains the natural language marker and the natural language text, prompting a particular large language model for natively valid replacement database query content based at least in part on the natural language text in the second database query;
   based at least in part on the prompting of the particular large language model, receiving particular database query content generated at least in part by the particular large language model;
   determining whether the particular database query content is natively valid for the database query language to retrieve data from one or more particular database structures that are referenced in the particular database query content;
   based at least in part on determining that the particular database query content is natively valid for the database query language to retrieve data from the one or more particular database structures that are referenced in the particular database query content, causing execution, by the database query processing service, of an operation responsive to the second database query using the particular database query content.

2. The computer-implemented method of claim 1, wherein causing execution, by the database query processing service, of the operation comprises causing execution, by the database query processing service, of the particular database query content to retrieve particular data from the one or more particular database structures, and including the particular data in a response to the second database query.

3. The computer-implemented method of claim 1, wherein causing execution, by the database query processing service, of the operation comprises providing, by the database query processing service in response to the second database query, the particular database query content and an option to proceed with execution of the particular database query content.

4. The computer-implemented method of claim 1, wherein causing execution, by the database query processing service, of the operation comprises:
   causing execution, by the database query processing service, of the particular database query content to retrieve particular data from the one or more particular database structures;
   prompting a large language model to generate a natural language result explaining the particular data retrieved;
   providing, by the database query processing service in response to the second database query, a natural language response based at least in part on the natural language result.

5. The computer-implemented method of claim 1, further comprising prompting a large language model to generate a natural language result explaining logic of the particular database query content; wherein causing execution, by the database query processing service, of the operation comprises providing, by the database query processing service in response to the second database query, a natural language response based at least in part on the natural language result.

6. The computer-implemented method of claim 1, further comprising providing, to the particular large language model, metadata identifying a plurality of data structures including the one or more particular data structures, wherein the metadata is associated with prompting the particular large language model for natively valid database query content based at least in part on the natural language text in the second database query.

7. The computer-implemented method of claim 6, wherein the metadata is stored in association with a profile of a plurality of profiles, wherein other metadata is stored in association with at least one other profile of the plurality of profiles, wherein the metadata identifies at least one data structure not identified by the other metadata; the computer-implemented method further comprising:
before receiving the first database query or the second database query, receiving a request to set the profile as an active profile in a session of the database query processing service;
wherein the first database query and the second database query are received in the session, and wherein the profile remains as the active profile during execution of the first database query and execution of the operation responsive to the second database query in the session.

8. The computer-implemented method of claim 1, further comprising providing, to the particular large language model, one or more example natively valid database queries that are not responsive to the second database query; wherein prompting the particular large language model for natively valid database query content based at least in part on the natural language text in the second database query uses the one or more example natively valid database queries that are not responsive to the second database query.

9. The computer-implemented method of claim 1, further comprising:
receiving a selection of the particular large language model from a plurality of available large language models; and
storing credentials for accessing the particular language model;
wherein prompting the particular large language model for natively valid replacement database query content based at least in part on the natural language text in the second database query uses one or more large language model instructions that are unique to the particular large language model of the plurality of large language models.

10. The computer-implemented method of claim 1, further comprising, in a session with the particular large language model, prompting the particular large language model to generate a natural language result, wherein the particular large language model is configured to use a prompt history in the session to generate the natural language result, and wherein the natural language result is based at least in part on information provided in one or more past prompts to the particular large language model.

11. The computer-implemented method of claim 1, wherein the natural language text is a first natural language text, further comprising:
storing the particular database query content in association with the first natural language text;
receiving, by the database query processing service, a third database query that includes the natural language marker and a second natural language text;
determining that the second natural language text is semantically equivalent to the first natural language text;
based at least in part on determining that the second natural language text is semantically equivalent to the first natural language text, causing execution, by the database query processing service, of the particular database query content to retrieve data from the one or more particular database structures without using a large language model to generate natively valid replacement database query content between receiving the third database query and execution of the particular database query content.

12. The computer-implemented method of claim 1, wherein the natural language text is a first natural language text, the computer-implemented method further comprising:
storing a first query template of the particular database query content in association with a first text template of the first natural language text, wherein the first text template includes one or more first placeholders for one or more variables, and wherein the first query template includes one or more second placeholders for one or more variables;
receiving, by the database query processing service, a third database query that includes the natural language marker and a second natural language text;
determining that the second natural language text matches the first text template when one or more particular variables of the second natural language text are replaced with the one or more first placeholders;
substituting the one or more second placeholders in the first query template with the one or more particular variables of the second natural language text to generate second particular query content;
causing execution, by the database query processing service, of the second particular database query content to retrieve data from the one or more particular database structures without using a large language model to generate natively valid replacement database query content between receiving the third database query and execution of the second particular database query content.

13. A computer-program product comprising one or more non-transitory machine-readable storage media, including stored instructions configured to cause a computing system to perform a set of actions including:
receiving, by a database query processing service operating on one or more computing devices, a first database query comprising one or more commands and one or more conditions that are natively valid for a database query language to retrieve data from one or more database structures that are referenced in the first database query without using a large language model to generate natively valid replacement database query content, wherein the first database query does not contain a natural language marker;
causing execution, by the database query processing service, of the first database query to retrieve data from one or more database structures without using a large language model to generate natively valid replacement database query content between receiving the first database query and execution of the first database query;
receiving, by the database query processing service, a second database query;

determining, by the database query processing service, that the second database query contains the natural language marker and natural language text;
based at least in part on determining that the second database query contains the natural language marker and the natural language text, prompting a particular large language model for natively valid replacement database query content based at least in part on the natural language text in the second database query;
based at least in part on the prompting of the particular large language model, receiving particular database query content generated at least in part by the particular large language model;
determining whether the particular database query content is natively valid for the database query language to retrieve data from one or more particular database structures that are referenced in the particular database query content;
based at least in part on determining that the particular database query content is natively valid for the database query language to retrieve data from the one or more particular database structures that are referenced in the particular database query content, causing execution, by the database query processing service, of an operation responsive to the second database query using the particular database query content.

14. The computer-program product of claim 13, wherein causing execution, by the database query processing service, of the operation comprises causing execution, by the database query processing service, of the particular database query content to retrieve particular data from the one or more particular database structures, and including the particular data in a response to the second database query.

15. The computer-program product of claim 13, wherein causing execution, by the database query processing service, of the operation comprises:
causing execution, by the database query processing service, of the particular database query content to retrieve particular data from the one or more particular database structures;
prompting a large language model to generate a natural language result explaining the particular data retrieved;
providing, by the database query processing service in response to the second database query, a natural language response based at least in part on the natural language result.

16. The computer-program product of claim 13, wherein the set of actions further includes providing, to the particular large language model, metadata identifying a plurality of data structures including the one or more particular data structures, wherein the metadata is associated with prompting the particular large language model for natively valid database query content based at least in part on the natural language text in the second database query.

17. The computer-program product of claim 13, wherein the natural language text is a first natural language text, and wherein the set of actions further includes:
storing a first query template of the particular database query content in association with a first text template of the first natural language text, wherein the first text template includes one or more first placeholders for one or more variables, and wherein the first query template includes one or more second placeholders for one or more variables;
receiving, by the database query processing service, a third database query that includes the natural language marker and a second natural language text;
determining that the second natural language text matches the first text template when one or more particular variables of the second natural language text are replaced with the one or more first placeholders;
substituting the one or more second placeholders in the first query template with the one or more particular variables of the second natural language text to generate second particular query content;
causing execution, by the database query processing service, of the second particular database query content to retrieve data from the one or more particular database structures without using a large language model to generate natively valid replacement database query content between receiving the third database query and execution of the second particular database query content.

18. A system comprising:
one or more processors;
one or more databases storing a plurality of data structures including data structures that may be referenced by valid native database queries;
one or more non-transitory computer-readable media storing instructions, which, when executed by the system, cause the system to perform a set of actions including:
receiving, by a database query processing service operating on one or more computing devices, a first database query comprising one or more commands and one or more conditions that are natively valid for a database query language to retrieve data from one or more database structures that are referenced in the first database query without using a large language model to generate natively valid replacement database query content, wherein the first database query does not contain a natural language marker;
causing execution, by the database query processing service, of the first database query to retrieve data from one or more database structures without using a large language model to generate natively valid replacement database query content between receiving the first database query and execution of the first database query;
receiving, by the database query processing service, a second database query;
determining, by the database query processing service, that the second database query contains the natural language marker and natural language text;
based at least in part on determining that the second database query contains the natural language marker and the natural language text, prompting a particular large language model for natively valid replacement database query content based at least in part on the natural language text in the second database query;
based at least in part on the prompting of the particular large language model, receiving particular database query content generated at least in part by the particular large language model;
determining whether the particular database query content is natively valid for the database query language to retrieve data from one or more particular database structures that are referenced in the particular database query content;
based at least in part on determining that the particular database query content is natively valid for the database query language to retrieve data from the one or more particular database structures that are referenced in the particular database query content, causing execution, by the database query processing service, of an operation responsive to the second database query using the particular database query content.

19. The system of claim 18, wherein causing execution, by the database query processing service, of the operation comprises causing execution, by the database query processing service, of the particular database query content to retrieve particular data from the one or more particular database structures, and including the particular data in a response to the second database query.

20. The system of claim 18, wherein the natural language text is a first natural language text, and wherein the set of actions further includes:

storing a first query template of the particular database query content in association with a first text template of the first natural language text, wherein the first text template includes one or more first placeholders for one or more variables, and wherein the first query template includes one or more second placeholders for one or more variables;

receiving, by the database query processing service, a third database query that includes the natural language marker and a second natural language text;

determining that the second natural language text matches the first text template when one or more particular variables of the second natural language text are replaced with the one or more first placeholders;

substituting the one or more second placeholders in the first query template with the one or more particular variables of the second natural language text to generate second particular query content;

causing execution, by the database query processing service, of the second particular database query content to retrieve data from the one or more particular database structures without using a large language model to generate natively valid replacement database query content between receiving the third database query and execution of the second particular database query content.

* * * * *